United States Patent
Achten et al.

(10) Patent No.: US 11,472,099 B2
(45) Date of Patent: Oct. 18, 2022

(54) METHOD FOR PRODUCING AN OBJECT BY MEANS OF AN ADDITIVE MANUFACTURING PROCESS USING A POLYCARBONATE BUILDING MATERIAL WITH IMPROVED FLOWABILITY

(71) Applicant: Covestro Deutschland AG, Leverkusen (DE)

(72) Inventors: Dirk Achten, Leverkusen (DE); Thomas Büsgen, Leverkusen (DE); Rolf Wehrmann, Krefeld (DE); Helmut Werner Heuer, Siegen (DE)

(73) Assignee: Covestro Deutschland AG, Leverkusen (DE)

( * ) Notice: Subject to any disclaimer, the term of this patent is extended or adjusted under 35 U.S.C. 154(b) by 408 days.

(21) Appl. No.: 16/485,224

(22) PCT Filed: Feb. 13, 2018

(86) PCT No.: PCT/EP2018/053575
§ 371 (c)(1),
(2) Date: Aug. 12, 2019

(87) PCT Pub. No.: WO2018/149831
PCT Pub. Date: Aug. 23, 2018

(65) Prior Publication Data
US 2019/0366621 A1 Dec. 5, 2019

(30) Foreign Application Priority Data
Feb. 14, 2017 (EP) .................... 17155988

(51) Int. Cl.
| B29C 64/106 | (2017.01) |
| C08K 5/103 | (2006.01) |
| C08L 69/00 | (2006.01) |
| B33Y 10/00 | (2015.01) |
| B33Y 70/00 | (2020.01) |
| B33Y 80/00 | (2015.01) |

(52) U.S. Cl.
CPC ............ *B29C 64/106* (2017.08); *C08K 5/103* (2013.01); *C08L 69/00* (2013.01); *B33Y 10/00* (2014.12); *B33Y 70/00* (2014.12); *B33Y 80/00* (2014.12)

(58) Field of Classification Search
None
See application file for complete search history.

(56) References Cited

U.S. PATENT DOCUMENTS

| 1,137,373 A | 4/1915 | Aylsworth |
| 1,191,383 A | 7/1916 | Aylsworth |
| 2,891,920 A | 6/1959 | Hyde et al. |
| 2,991,273 A | 7/1961 | Hechelhammer et al. |
| 2,999,825 A | 9/1961 | Floyd et al. |
| 2,999,846 A | 9/1961 | Schnell et al. |
| 3,028,365 A | 4/1962 | Schnell et al. |
| 3,148,172 A | 9/1964 | Fox |
| 3,271,367 A | 9/1966 | Schnell et al. |
| 3,294,725 A | 12/1966 | Findlay et al. |
| 3,404,061 A | 10/1968 | Shane et al. |
| 3,879,348 A | 4/1975 | Serini et al. |
| 4,806,593 A | 2/1989 | Kress et al. |
| 4,812,515 A | 3/1989 | Kress et al. |
| 4,859,740 A | 8/1989 | Damrath et al. |
| 4,861,831 A | 8/1989 | Damrath et al. |
| 4,888,388 A | 12/1989 | Hongo et al. |
| 4,982,014 A | 1/1991 | Freitag et al. |
| 5,288,778 A | 2/1994 | Schmitter et al. |
| 5,807,914 A | 9/1998 | Obayashi et al. |
| 5,821,380 A | 10/1998 | Holderbaum et al. |
| 5,883,165 A | 3/1999 | Kröhnke et al. |
| 11,279,812 B2 * | 3/2022 | Wehrmann ............... C08K 5/09 |
| 2004/0041303 A1 * | 3/2004 | Kim ....................... B29C 33/06 264/320 |
| 2005/0048304 A1 * | 3/2005 | Jones ........................ B44C 5/04 428/542.2 |
| 2009/0269659 A1 * | 10/2009 | Levasalmi ........... H01M 50/116 429/163 |
| 2014/0329940 A1 * | 11/2014 | van der Mee .......... C08L 83/10 524/95 |
| 2016/0024298 A1 * | 1/2016 | Hayasaka .............. C08K 5/103 524/313 |
| 2017/0217090 A1 * | 8/2017 | Endoh ................... B29C 64/112 |
| 2017/0362410 A1 * | 12/2017 | Wehrmann .............. C08L 69/00 |
| 2017/0362430 A1 * | 12/2017 | Heuer .................... C08K 5/435 |
| 2018/0201755 A1 | 7/2018 | Wehrmann et al. |
| 2018/0201780 A1 * | 7/2018 | Heuer .................... C08K 3/013 |
| 2019/0153199 A1 * | 5/2019 | Wehrmann ............. C08K 5/521 |
| 2019/0161576 A1 * | 5/2019 | Wehrmann ............. C08L 69/00 |

FOREIGN PATENT DOCUMENTS

| CN | 101400749 A * | 4/2009 | ............... C05G 3/00 |
| CN | 101796134 * | 8/2012 | |

(Continued)

OTHER PUBLICATIONS

International Search Report for PCT/EP2018/053575 dated Apr. 18, 2018.

(Continued)

*Primary Examiner* — Joseph S Del Sole
*Assistant Examiner* — Guy F Mongelli
(74) *Attorney, Agent, or Firm* — Jed C. Benson

(57) ABSTRACT

The invention relates to a method for producing an object by means of a fused deposition modeling method (FDM), from a construction material, wherein the construction material comprises a polycarbonate and a di-glycerol ester. The invention also relates to the use of a polycarbonate with improved flowability comprising a diglycerol as construction material in an additive fused deposition modeling method.

13 Claims, No Drawings

(56) References Cited

FOREIGN PATENT DOCUMENTS

| | | | | |
|---|---|---|---|---|
| CN | 102666703 | * | 9/2012 | |
| CN | 104730727 | * | 6/2015 | |
| DE | 1570703 | A1 | 2/1970 | |
| DE | 2036052 | A1 | 1/1972 | |
| DE | 2063050 | A1 | 7/1972 | |
| DE | 2211956 | A1 | 10/1973 | |
| DE | 3631539 | A1 | 3/1988 | |
| DE | 3631540 | A1 | 3/1988 | |
| DE | 3704655 | A1 | 8/1988 | |
| DE | 3704657 | A1 | 8/1988 | |
| DE | 3832396 | A1 | 2/1990 | |
| EP | 0430134 | A2 | 6/1991 | |
| EP | 0500496 | A1 | 8/1992 | |
| EP | 0839623 | A1 | 5/1998 | |
| EP | 1637565 | A1 * | 3/2006 | ............. C08K 5/053 |
| FR | 1561518 | A | 3/1969 | |
| GB | 1122003 | A | 7/1968 | |
| GB | 1229482 | A | 4/1971 | |
| GB | 1367790 | A | 9/1974 | |
| JP | S6162039 | A | 3/1986 | |
| JP | S6162040 | A | 3/1986 | |
| JP | S61105550 | A | 5/1986 | |
| JP | 2004515589 | * | 5/2004 | |
| JP | 2005/062209 | * | 3/2005 | |
| JP | 2008/115250 | * | 5/2008 | |
| JP | 4394290 | B2 * | 1/2010 | ............. C08K 5/523 |
| JP | 2011/256359 | * | 12/2011 | |
| JP | 2014/210833 | * | 11/2014 | |
| KR | 2009/072082 | * | 7/2009 | |
| KR | 2016/0039155 | * | 10/2016 | |
| WO | WO-9615102 | A2 | 5/1996 | |
| WO | WO-2015077053 | A1 | 5/2015 | |
| WO | WO-2015193818 | A1 | 12/2015 | |
| WO | WO-2015195527 | A1 | 12/2015 | |
| WO | WO-2016024531 | A1 * | 2/2016 | ............. B05D 1/007 |
| WO | WO-2016087296 | A1 | 6/2016 | |
| WO | WO-2017005735 | A1 | 1/2017 | |
| WO | WO-2017005739 | A1 | 1/2017 | |

OTHER PUBLICATIONS

Written Opinion of the International Searching Authority for PCT/EP2018/053575 dated Apr. 18, 2018.

* cited by examiner

METHOD FOR PRODUCING AN OBJECT BY MEANS OF AN ADDITIVE MANUFACTURING PROCESS USING A POLYCARBONATE BUILDING MATERIAL WITH IMPROVED FLOWABILITY

CROSS-REFERENCE TO RELATED APPLICATIONS

This application is a national stage application (under 35 U.S.C. § 371) of PCT/EP2018/053575, filed Feb. 13, 2018, which claims benefit of European Application No. 17155988.3, filed Feb. 14, 2017, both of which are incorporated herein by reference in their entirety.

The present invention relates to a process for producing an article by means of an additive manufacturing process from a construction material, therein the construction material comprises a polycarbonate having improved flow-ability. It further relates to the use of a polycarbonate having improved flowability as construction material in an additive melt layering method.

The use of polycarbonates in additive manufacturing methods ("3D printing methods") is known in principle. For instance, WO 2015/077053 A1 discloses an article having reduced density, comprising a thermoplastic polycarbonate composition. The article has a density (ASTM D792-00) of 80% to 99%, based on the weight of a similar solid injection molding without voids. In addition, the article has a microstructure, determined by optical microscopy, with 1% by volume to 20% by volume of voids, wherein al least 80% of the voids are those having a high ratio of length to width and less than 20% of the voids are spherical voids having a diameter between 10 and 100 micrometers. The thermoplastic polycarbonale composition comprises at least 50 mol % bisphenol A and has a weight-average molecular weight ($M_w$) of 10 000 to 50 000, a glass transition temperature Tg of 130° C. to 180° C., a content of phenolic OH groups of less than 50 ppm, a halogen group content of below 100 ppm and a diaryl carbonate content of less than 1% by weight. The article is manufactured by means of a monofilament-based additive manufacturing technique.

WO 2015/195527 A1 relates to a process for producing a thermoplastic article in which a multitude of layers of a thermoplastic material is laid out in a predetermined pattern in order to form the article. The thermoplastic material comprises a thermoplastic composition having a melt flow index of 30 grams/10 minutes to 75 grams/10 minutes to ASTM D1238-04 at either 230° C. and 3.8 kg or at 300° C. and 1.2 kg. The thermoplastic material may be a polycarbonate homopolymer, a polycarbonate copolymer, a polyester or a combination thereof.

WO 2015/193818 A1 discloses a process for producing an article, in which one or more layers of an extruded material in the molten state are laid out in a predetermined pattern, wherein at least one of the layers is formed from a construction material. The construction material is exposed to an effective dose of ultraviolet radiation in order to trigger crosslinking within the article. The construction material here is a polymeric composition comprising a crosslinkable polycarbonate resin with a photoactive group derived from a benzophenone.

Polycarbonates are polymers having a comparatively high glass transition temperature. The processing parameters and formulations for polycarbonates have to take account of this fact. In this respect, a distinction can be drawn between two polycarbonate types: extrusion types and injection molding types. Extrusion types are optimized to remain as dimensionally stable as possible after exit from an extrusion die. By contrast, injection molding types should have greater flowability in order to be able to reproduce all structures of the mold.

In this connection, WO 2016/087296 A1, WO 2017/005735 A1 and WO 2017/005739 A1 relate to the use of diglycerol esters as flow auxiliary in polycarbonate melts. For example, WO 2016/087296 A1 discloses a composition comprising: A) 20% by weight to 99.0% by weight of aromatic polycarbonate; B) 0.0% to 1.0% by weight of at least one flame retardant; C) 0.5% by weight to 50.0% by weight of at least one glass fiber, one carbon fiber and/or carbon nanotubes; D) 0.01% by weight to 3.0% by weight of at least one flow auxiliary selected from the group of the diglycerol esters; E) 0.0% by weight to 5.0% by weight of at least one anti-dripping agent; F) 0.0% by weight to 1.0% by weight of at least one thermal stabilizer and G) 0.0% by weight to 10.0% by weight of further additives.

It is an object of the present invention to at least partly overcome at least one disadvantage of the prior art. It is a further object of the present invention to specify an additive manufacturing method by which especially filled and/or high molecular weight polycarbonate-based construction materials can be processed with improved flowability.

The object is achieved in accordance with the invention by a process as claimed in claim 1 and a use as claimed in claim 13. Advantageous developments are specified in the subsidiary claims. They may be combined as desired, unless the opposite is unambiguously apparent from the context.

What is envisaged in accordance with the invention is that the construction material comprises polycarbonate and a flow auxiliary selected from the group of the diglycerol esters. Thus, in view of WO 2016/087296 A1, WO 2017/005735 A1 and WO 2017/005739 A1, the polycarbonate formulation used would be an injection molding type. It has been found that, surprisingly, such a formulation can also be used advantageously in an extrusion-based additive manufacturing method.

A process for producing an article by means of an additive manufacturing method comprises the steps of:
- applying a filament of an at least partly molten construction material to a carrier, such that a layer of the construction material is obtained, corresponding to a first selected cross section of the article;
- applying a filament of the at least partially molten construction material onto a previously applied layer of the construction material to obtain a further layer of the construction material which corresponds to a further selected cross section of the article and which is joined to the previously applied layer;
- repeating the step of applying a filament of the at least partially molten construction material onto a previously applied layer of the construction material until the article has been formed.

The construction material comprises:
A) 20 wt % to 99.0 wt % of an aromatic polycarbonate,
B) 0.0% to 1.0% by weight of at least one flame retardant,
C) 0.0% by weight to 50.0% by weight of a component selected from: glass fibers, carbon fibers, carbon nanotubes, graphite, impact modifiers or mixtures of at least two of these,
D) 0.01% by weight to 3.0% by weight of at least one flow auxiliary selected from the group of the diglycerol esters,
E) 0.0% by weight to 5.0% by weight of at least one anti-dripping agent,
F) 0.0% by weight to 1.0% by weight of at least one thermal stabilizer, G) 0.0% by weight to 10.0% by weight of further additives, wherein components A) to G) add up to 100% by weight in the construction material.

The article to be produced may be the sole aim of the production process. Alternatively; it is possible that the article to be produced is part of a larger composite and the production thereof constitutes a component step in the production of the composite.

According to the invention, the article is produced by means of an additive manufacturing method ("3D printing") from a construction material. The additive manufacturing method here is a melt layering method (fused filament fabrication, FFF, or fused deposition modeling, FDM). If the number of repetitions for the applying is sufficiently low, it is also possible to make reference to a two-dimensional article which is to be constructed. Such a two-dimensional article can also be characterized as a coating. For example, for construction thereof, ≥1 to ≤20 repetitions for the application can be conducted.

The individual filaments which are applied may have a diameter of ≥30 μm to ≤2000 μm, preferably ≥40 μm to ≤1000 μm and particularly preferably ≥50 μm to ≤500 μm.

The first step of the process relates to the construction of the first layer on a carrier. Subsequently, the second step, in which further layers are applied to previously applied layers of the construction material, is executed until the desired end result in the form of the article is obtained. The at least partly molten construction material bonds to existing layers of the material in order to form a structure in z direction.

In layer-by-layer model production, the individual layers are thus bonded to form a complex part. A body is typically constructed by repeatedly tracing a working plane in each case line by line (forming a layer) and then moving the working plane upward in a "stacking" manner (forming at least one further layer atop the first layer), so as to form a shape layer by layer. The exit temperature of the mixtures of material from the nozzle may, for example, be 80° C. to 420° C. It is additionally possible to heat the substrate table and/or any construction space present, for example to 20° C. to 250° C. This can prevent excessively rapid cooling of the layer applied, such that a further layer applied thereto bonds adequately to the first layer.

The construction material preferably does not contain any further components; instead, components A) to G) add up to 100% by weight.

The construction material may have, for example, a melt volume flow rate MVR of 1 to 100 $cm^3$/10 min, further preferably of 2 to 85 and especially preferably of 3 to 75 $cm^3$/10 min, determined to ISO 1133 (testing temperature 300° C., mass 1.2 kg), determined to ISO 1133 (testing temperature 300° C., mass 1.2 kg), and, in the case that glass fibers are present in the compositions, a Charpy impact resistance, determined to DIN EN ISO 179 at room temperature, of greater than 35 kJ/$m^2$. The molecular weights Mw of the construction material are between 10 000 g/mol and 50 000 g/mol, preferably between 12 000 g/mol and 40 000 g/mol and more preferably between 15 000 g/mol and 38 000 g/mol (determined by GPC with a BPA polycarbonate calibration).

Components A to G of the construction material are elucidated below:

Component A

For the purposes of the present invention, polycarbonates are either homopolycarbonates or copolycarbonates; the polycarbonates can, as is known, be linear or branched. According to the invention, it is also possible to use mixtures of polycarbonates.

The polycarbonates are prepared in a known manner from diphenols, carbonic acid derivatives, and optionally chain terminators and branching agents.

Details of the production of polycarbonates have been set out in many patent specifications during the last approximately 40 years. Reference may be made here, by way of example, to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne, BAYER AG, "Polycarbonates" in Encyclopedia of Polymer Science and Engineering, Volume 11, Second Edition, 1988, pages 648-718 and finally to U. Grigo, K. Kirchner and P. R. Müller "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Flanser Verlag Munich, Vienna 1992, pages 117-299.

Aromatic polycarbonates are prepared, for example, by reacting diphenols with carbonic halides, preferably phosgene, and/or with aromatic dicarbonyl dihalides, preferably benazenedicarbonyl dihalides, by the interfacial process, optionally using chain terminators and optionally using trifunctional or more than trifunctional branching agents. Production via a melt polymerization process by reaction of diphenols with diphenyl carbonate, for example, is likewise possible.

Diphenols suitable for the preparation of polycarbonates are, for example, hydroquinone, resorcinol, dihydroxydiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfides, bis(hydroxyphenyl) sulfoxides, α,α'-bis(hydroxyphenyl)diisopropylbenzenes, phthalimidines derived from isatin derivatives or from phenolphthalein derivatives, and also the related ring-alkylated, ring-arylated and ring-halogenated compounds.

Preferred diphenols are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxypheny)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A.

These and further suitable diphenols are described, for example, in U.S. Pat. Nos. 3,028,635, 2,999,825, 3,148,172, 2,991,273, 3,271,367, 4,982,014 and 2,999,846, in DE-A 1 570 703, DE-A 2063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

Only one diphenol is used in the case of the homopolycarbonates, and two or more diphenols in the case of the copolycarbonates.

Examples of suitable carbonic acid derivatives include phosgene or diphenyl carbonate.

Suitable chain terminators that may be used in the preparation of the polycarbonates are monophenols. Suitable monophenols are for example phenol itself, alkylphenols such as cresols, p-tert-butylphenol, cumylphenol and mixtures thereof.

Preferred chain terminators are the phenols mono- or polysubstituted by linear or branched $C_1$- to $C_{30}$-alkyl radicals, preferably unsubstituted or tert-butyl-substituted. Particularly preferred chain terminators are phenol, cumylphenol and/or p-tert-butylphenol.

The amount of chain terminator to be used is preferably 0.1 to 5 mol %, based on moles of diphenols used in each case. The chain terminators can be added before, during or after the reaction with a carbonic acid derivative.

Suitable branching agents are the trifunctional or more than trifunctional compounds known in polycarbonate chemistry, in particular those having three or more than three phenolic OH groups.

Examples of suitable branching agents include 1,3,5-tri (4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2, 4-dihydroxyphenyl)propane, tetra(4-hydroxyphenyl) methane, tetra(4-(4-hydroxyphenylisopropyl)phenoxy) methane and 1,4-bis(1(4',4''-dihydroxytriphenyl)methyl) benzene and 3,3-bis(3-methyl-4-hydroxyphenyl)-2-oxo-2,3-dihydroindole.

The amount of the branching agents for optional use is preferably from 0.05 mol % to 2.00 mol % based on moles of diphenols used in each case.

The branching agents can either be initially charged with the diphenols and the chain terminators in the aqueous alkaline phase or added dissolved in an organic solvent before the phosgenation. In the case of the transesterification process, the branching agents are used together with the diphenols.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

For incorporation of additives, component A is preferably used in the form of powders, pellets or mixtures of powders and pellets.

By way of example, in the case of glass-fiber-filled compositions it is preferable to use a mixture of the aromatic polycarbonates A1 and A2 with the following properties:

The amount of the aromatic polycarbonate A1, based on the total amount of polycarbonate, is 25.0% to 85.0% by weight, preferably 28.0% to 84.0% by weight, more preferably 30.0% to 83.0% by weight, where this aromatic polycarbonate is based on bisphenol A with a preferred melt volume flow rate MVR of 7 to 15 $cm^3/10$ min, further preferably with a melt volume flow rate MVR of 8 to 12 $cm^3/10$ min and more preferably with a melt volume flow rate MVR of 8 to 11 $cm^3/10$ min, determined in accordance with ISO 1133 (testing temperature 300° C., mass 1.2 kg).

The amount of the pulverulent aromatic polycarbonate A2, based on the total amount of polycarbonate, is 3.0% to 12.0% by weight, preferably 4.0% to 11.0% by weight, more preferably 3.0% to 10.0% by weight, where this aromatic polycarbonate is preferably based on bisphenol A with a preferred melt volume flow rate MVR of 3 to 8 $cm^3/10$ min, further preferably with a melt volume flow rate MVR of 4 to 7 $cm^3/10$ min and more preferably with a melt volume flow rate MVR of 6 $cm^3/10$ min, determined in accordance with ISO 1133 (testing temperature 300° C., mass 1.2 kg).

Component B

The amount of flame retardants in the construction material of the invention, based on the total weight of the construction material, is preferably 0.001% to 1.0% by weight, further preferably 0.05% to 0.80% by weight, more preferably 0.10% to 0.60% by weight, most preferably 0.10% to 0.40% by weight.

In a further preferred embodiment, a flame retardant present in the construction material is an alkali metal and/or alkaline earth metal salt of an aliphatic or aromatic sulfonic acid or of a sulfonamide.

Examples of salts that may be used in the construction material of the invention include: sodium perfluorobutanesulfate, potassium perfluorobutanesulfate, sodium perfluoromethanesulfonate, potassium perfluoromethanesulfonate, sodium perfluorooctanesulfate, potassium perfluoroactanesulfate, sodium 2,5-dichlorobenzenesulfate, potassium 2,5-dichlorobenzenesulfate, sodium 2,4,5-trichlorobenzenesulfate, potassium 2,4,5-trichlorobenzenesulfate, sodium methylphosphonate, potassium methylphosphonate, sodium (2-phenylethylene)phosphonate, potassium (2-phenylethylene)phosphonate, sodium pentachlorobenzoate, potassium pentachlorobenzoate, sodium 2,4,6-trichioroberizoate, potassium 2,4,6-trichlorobenzoate, sodium 2,4-dichlorobenzoate, potassium 2,4-dichlorobenzoate, lithium phenylphosphonate, sodium diphenylsulfone sulfonate, potassium diphenylsulfone sulfonate, sodium 2-formylbenzenesulfonate, potassium 2-formylbenzenesulfonate, sodium (N-benzenesulfonyl)benzenesulfonamide, potassium (N-benzenesulfonyl)benzenesulfonamide, trisodium hexafluoroaluminate, tripotassium hexafluoroaluminate, disodium hexafluorotitanate, dipotassium hexafluorotitanate, disodium hexafluorosilicate, dipotassium hexafluorosilicate, disodium hexafluorozirconate, dipotassium hexafluorozirconate, sodium pyrophosphate, potassium pyrophosphate, sodium metaphosphate, potassium metaphosphate, sodium tetrafluoroborate, potassium tetrafluoroborate, sodium hexafluorophosphate, potassium hexafluorophosphate, sodium phosphate, potassium phosphate, lithium phosphate, sodium nonafluro-1-butanesulfonate, potassium nonafluoro-1-butanesulfonate or mixtures thereof.

Preference is given to using sodium perfluorobutanesulfate, potassium perfluorobutanesulfate, sodium perfluorooctanesulfate, potassium perfluorooctanesulfate, sodium diphenylsulfone sulfonate, potassium diphenylsulfone sulfonate, sodium 2,4,6-trichlorobenzoate, potassium 2,4,6-trichlorobenzoate. Very particular preference is given to potassium nonafluoro-1-butanesulfonate or sodium diphenylsulfone sulfonate or potassium diphenylsulfone sulfonate. Potassium nonafluoro-1-butanesulfonate is commercially available, inter alia, as Bayowet®C4 (from Lanxess, Leverkusen, Germany, CAS No. 29420-49-3), RM64 (from Miteni, Italy) or as 3M™ perfluorobutanesulfonyl fluoride FC-51 (from 3M, USA). Mixtures of the salts mentioned are likewise suitable.

Component C

The construction material of the invention contains 0.0% to 50.0% by weight, preferably 0.50% to 45.0% by weight, especially preferably 1.0% to 38.0% by weight, further preferably 1.0% to 35.0% by weight, of a component selected from: glass fibers, carbon fibers, carbon nanotubes, graphite, impact modifiers or mixtures of at least two of these.

Glass Fibers:

The glass fibers consist of a glass composition selected from the group of the M, E, A, S, R, AR, ECR, D, Q and C glasses, preference being given to E, S or C glass.

The glass composition is preferably used in the form of solid glass spheres, hollow glass spheres, glass beads, glass flakes, broken glass and glass fibers, further preference being given to the glass fibers.

The glass fibers may be used in the form of continuous fibers (rovings), chopped glass fibers, ground fibers, glass fiber weaves or mixtures of the abovementioned forms, preference being given to the use of chopped glass fibers and ground fibers.

In a further preferred embodiment, the construction material includes glass fibers as component C and the construction material also has one or more of the following properties:
- the construction material contains 0.001% to 1.0% by weight of a flame retardant
- the glass fibers are chopped glass fibers
  - glass fibers have been incorporated in the construction material by compounding and the glass fibers have a length prior to the compounding of 0.5 mm to 10 mm
- the glass fibers have an average fiber diameter of 5 to 25 µm.

Particular preference is given to using chopped glass fibers. The preferred fiber length of chopped glass fibers incorporated by compounding, prior to compounding, is 0.5 to 10 mm, further preferably 1.0 to 8 mm, most preferably 1.5 to 6 mm.

Chopped glass fibers may be used with different cross sections. Preference is given to using round, elliptical, oval, figure-of-8 and flat cross sections, particular preference being given to round, oval and flat cross sections.

The diameter of round fibers is preferably 5 to 25 µm, further preferably 6 to 20 µm, more preferably 7 to 17 µm.

Preferred flat and oval glass fibers have a cross-sectional ratio of height to width of about 1.0:1.2 to 1.0:8.0, preferably 1.0:1.5 to 1.0:6.0, more preferably 1.0:2.0 to 1.0:4.0.

The flat and oval glass fibers preferably have an average fiber height of 4 µm to 17 µm, further preferably of 6 µm to 12 µm and especially preferably 6 µm to 8 µm and an average fiber width of 12 µm to 30 µm, further preferably 14 µm to 28 µm and especially preferably 16 µm to 26 µm.

The glass fibers may have been modified with a glass sizing agent on the surface of the glass fiber. Preferred glass sizing agents are epoxy-modified, polyurethane-modified and unmodified silane compounds and mixtures of the aforementioned silane compounds.

The glass fibers may also not have been modified with a glass sizing agent.

It is a feature of the glass fibers used that the selection of the fibers is not limited by the interaction characteristics of the fiber with the polycarbonate matrix.

An improvement in the inventive properties of the construction material is found both for strong binding to the polymer matrix and in the case of a non-binding fiber.

Binding of the glass fiber to the polymer matrix is apparent in the low-temperature fracture surfaces in scanning electron micrographs, with the majority of the broken glass fibers broken at the same height as the matrix and only individual glass fibers protruding from the matrix. In the converse case of non-binding characteristics, scanning electron micrographs show that the glass fibers protrude significantly from the matrix or have slid out completely in low-temperature fracture.

If glass fibers are present, more preferably 10% to 35% by weight and most preferably 10% to 30% by weight of glass fibers are present in the construction material.

Carbon Fibers:

Carbon fibers are industrially manufactured from precursors such as polyacrylic fibres, for example, by pyrolysis (carbonization). A distinction is made between filament yarn and short fibers.

Preference is given to using short fibers in the construction material.

The length of the chopped fibers is preferably between 3 mm and 125 mm. Particular preference is given to using fibers of length 3 mm to 25 mm.

In addition to fibers of round cross section, fibers of cubic dimension (platelet shaped) are also usable. Suitable dimensions are for example 2 mm×4 mm×6 mm.

Ground carbon fibers are also usable as well as the chopped fibers. Preferred ground carbon fibers have lengths of 50 µm to 150 µm.

Carbon fibers optionally have coatings of organic sizing order to enable particular modes of binding to the polymer matrix.

Short chopped fibers and ground carbon fibers are typically added to the polymeric base materials by compounding.

With the aid of specific technical methods, carbon is arranged in ultrafine filaments. These filaments typically have a diameter of 3 to 10 µm. The filaments can also be used to produce rovings, wovens, nonwovens, tapes, hoses or the like.

If the compositions contain carbon fibers, preferably 10% to 30% by weight, further preferably 10% to 20% by weight, even further preferably 12% to 20% by weight, of carbon fibers are present.

Carbon Nanotubes

Carbon nanotubes, also called CNTs, in the context of the invention are all single-wall or multiwall carbon nanotubes of the cylinder type or scroll type or with an onion-like structure. Preference is given to using multiwall carbon nanotubes of the cylinder type or scroll type or mixtures thereof.

The carbon nanotubes are preferably used in an amount of 0.1% to 10% by weight, more preferably of 0.5% to 8% by weight, even more preferably of 0.75% to 6% by weight and especially preferably of 1% to 5% by weight (based on the total weight of components A, B, C and D). In masterbatches, the concentration of the carbon nanotubes may be greater and may be up to 80% by weight.

Particular preference is given to using carbon nanotubes with a ratio of length to external diameter of greater than 5, preferably greater than 40.

The carbon nanotubes are more preferably used in the form of agglomerates, where the agglomerates especially have an average diameter in the range from 0.01 to 5 mm, preferably 0.05 to 2 mm, more preferably 0.1-1 mm.

The carbon nanotubes to be used more preferably have essentially an average diameter of 3 to 100 nm, preferably 5 to 80 nm, more preferably 6 to 60 nm.

Graphite

Graphites are used in the compositions in the form of fibers, rods, beads, hollow beads, platelets and/or in powder form, in each case either in aggregated or agglomerated form, preferably in platelet form. A particle having a structure in the form of a platelet is understood in accordance with the invention to mean a particle having a two-dimensional geometry. Thus, the height of the particles is typically markedly smaller compared to the width or length of the particles. Such two-dimensional particles may in turn be agglomerated or aggregated into constructs.

In a further preferred embodiment, the graphite used is at least partly expanded graphite. This use can be effected alone or in a mixture with unexpanded graphite, more preferably solely expended graphite. In the expanded graphites the individual basal planes of the graphite have been driven apart by a special treatment which results in an increase in volume of the graphite, preferably by a factor of 200 to 400. The production of expanded graphites is described inter alia in documents U.S. Pat. Nos. 1,137,373 A, 1,191,383 A and 3,404,061 A. Preference is given in accordance with the invention to using an expanded graphite having a relatively high specific surface area (expanded graphite flakes), determined as the BET surface area by means of nitrogen adsorption as per ASTM D3037. Preference is given to using graphites having a BET surface area of >5 $m^2/g$, more preferably >10 $m^2/g$ and most preferably >18 $m^2/g$ in the construction material.

Commercially available graphites include Ecophit®GFG 5, Ecophit®GFG 50, Ecophit®GFG 200, Ecophit®GFG 350, Ecophit®GFG 500, Ecophit®GFG 900, Ecophit®GFG 1200 from SGL Carbon GmbH, TIMREX®BNB90, TIMREX®KS5-44, TIMREX®KS6, TIMREX®KS 150, TIMREX®SFG44, TIMREX®FG150, TIMREX®C-THERM™ 001 and TIMREX®C-THERM™ 011 from TIMCAL Ltd., SC 20 O, SC 4000 O/SM and SC 8000 O/SM from Graphit Kropfmühl AG, Mechano-Cond 1, Mechano-Lube 2 and Meehano-Lube 4G from H.C. Carbon GmbH, Nord-Min 251 and Nord-Min 560T from Nordmann Rassmann GmbH, and ASBURY A99, Asbury 230U and Asbury 3806 from Asbury Carbons.

Impact Modifiers

In a further preferred embodiment, the impact modifier comprises one or more graft polymer(s) of C.1 5% to 95% by weight (preferably 30% to 90% by weight) of at least one vinyl monomer C.2 95% to 5% by weight (preferably 70% to 10% by weight) of at least one graft base selected from diene rubbers, EP(D)M rubbers (i.e. rubbers based on ethylene/propylene and optionally diene), acrylate rubbers, polyurethane rubbers, silicone rubbers, silicone acrylate rubbers, chloroprene rubbers, ethylene/vinyl acetate rubbers or mixtures of at least two of these.

The graft base C.2 preferably has a median particle size ($d_{50}$) of 0.05 to 10 μm, preferably 0.1 to 5 μm, especially preferably 0.2 to 0.4 μm.

Monomers C.1 are preferably mixtures of

C.1.1 50 to 99 parts by weight of vinylaromatics and/or ring-substituted vinylaromatics (such as styrene, α-methylstyrene, p-methylstyrene, p-chlorostyrene) and/or ($C_1$ to $C_8$)-alkyl (meth)acrylates, such as methyl methacrylate, ethyl methacrylate), and C.1.2 1 to 50 parts by weight of vinyl cyanides (unsaturated nitriles, such as acrylonitrile and methacrylonitrile) and/or ($C_1$ to $C_8$)-alkyl (meth)acrylates, such as methyl methacrylate, n-butyl acrylate, tert-butyl acrylate, and/or derivatives (such as anhydrides and imides) of unsaturated carboxylic acids, for example maleic anhydride and N-phenylmaleimide.

Preferred monomers C.1.1 are selected from at least one of the monomers styrene, α-methylstyrene and methyl methacrylate. Preferred monomers C.1.2 are selected from at least one of the monomers acrylonitrile, maleic anhydride and methyl methacrylate. Particularly preferred monomers are C.1.1 styrene and C.1.2 acrylonitrile.

Preferred graft bases C.2 are silicone acrylate rubbers, diene rubbers (for example those based on butadiene and isoprene) and mixtures of diene rubbers. For the purposes of the invention, the term diene rubbers also covers copolymers of diene rubbers or of mixtures of these with other copolymerizable monomers (e.g. as per C.1.1 and C.1.2).

The glass transition temperature of the graft bases C.2 is generally <10° C., preferably <0° C., more preferably <−10° C. The gel content of the graft base C.2 is preferably at least 20% by weight, and in the case of graft bases C.2 produced by the emulsion polymerization process preferably at least 40% by weight (measured in toluene).

Preferably, the graft polymer made of components C.1 and C.2 has a core-shell structure where component C.1 forms the shell and component C.2 forms the core; (see by way of example Ullmann's Encyclopedia of Industrial Chemistry, VCH-Verlag, Vol. A21, 1992, page 635 and page 656). The graft copolymers of component C are produced by free-radical polymerization, for example by emulsion, suspension, solution or bulk polymerization, preferably by emulsion or bulk polymerization.

Since, as is well known, the graft monomers are not necessarily grafted completely onto the graft base in the grafting reaction, according to the invention, graft polymers C are also understood to mean those products which are obtained through (co)polymerization of the graft monomers in the presence of the graft base and which are also obtained during workup.

Suitable acrylate rubbers C.2 of the polymers C are preferably polymers of alkyl acrylates, optionally with up to 40% by weight, based on C.2, of other polytnerizable, ethylenically unsaturated monomers. Among the preferred polymerizable acrylic esters are $C_1$- to $C_8$-alkyl esters, such as methyl, ethyl, butyl, n-octyl and 2-ethylhexyl esters; haloalkyl esters, preferably halo-$C_1$-to-$C_8$-alkyl esters, such as chloroethyl acrylate, and also mixtures of these monomers.

Monomers having more than one polymerizable double bond can be copolymerized for crosslinking purposes. Preferred examples of crosslinking monomers are esters of unsaturated monocarboxylic acids having 3 to 8 carbon atoms and unsaturated monohydric alcohols having 3 to 12 carbon atoms, or of saturated polyols having 2 to 4 OH groups and 2 to 20 carbon atoms, such as ethylene glycol dimethacrylate, allyl methacrylate; polyunsaturated heterocyclic compounds, such as trivinyl and triallyl cyanurate; polyfunctional vinyl compounds, such as di- and trivinylbenzenes; but also triallyl phosphate and diallyl phthalate. Preferred crosslinking monomers are allyl methacrylate, ethylene glycol dimethacrylate, diallyl phthalate and heterocyclic compounds which have at least three ethylenically unsaturated groups. Particularly preferred crosslinking monomers are the cyclic monomers triallyl cyanurate, triallyl isocyanurate, triacryloylhexahydro-s-triazine, triallylbenzenes. The amount of the crosslinked monomers is preferably 0.02% to 5%, especially 0.05% to 2%, by weight, based on the graft base C.2. In the case of cyclic crosslinking monomers having at least three ethylenically unsaturated groups, it is advantageous to limit the amount to below 1% by weight of the graft base C.2.

Examples of preferred "other" polymerizable, ethylenically unsaturated monomers which can optionally serve alongside the acrylic esters for production of the graft base C.2 are acrylonitrile, styrene, α-methylstyrene, acrylamides, vinyl $C_1$-$C_6$-alkyl ethers, methyl methacrylate, butadiene.

Preferred acrylate rubbers for use as graft base C.2 are emulsion polymers having a gel content of at least 60% by weight.

Suitable silicone rubbers as per C.2 can be produced via emulsion polymerization, as described by way of example in U.S. Pat. Nos. 2,891,920 and 3,294,725. Further suitable graft bases as per C.2 are silicone rubbers having active grafting sites, as described in DE-A 1 3 704 657, DE-A 1 3 704 655, DE-A 1 3 631 540 and DE-A 1 3 631 539.

Also suitable as graft bases C.2 in accordance with the invention are silicone acrylate rubbers. These silicone acrylate rubbers are composite rubbers having graft-active sites and containing 10-90% by weight of silicone rubber fraction and 90% to 10% by weight of polyalkyl (meth)acrylate rubber fraction, where the two rubber components mentioned interpenetrate one another in the composite rubber such that they are essentially inseparable from one another. If the proportion of the silicone rubber component in the composite rubber is too high, the finished resin compositions have disadvantageous surface properties and worse tolerability. If, by contrast, the content of the polyalkyl (meth)acrylate rubber component in the composite rubber is too high, the impact resistance of the finished resin composition is adversely affected.

Silicone acrylate rubbers are known and are described by way of example in U.S. Pat. No. 5,807,914, EP-A2 430134 and U.S. Pat. No. 4,888,388. Preference is given to using a graft polymer produced by emulsion polymerization where C.1 is methyl methacrylate and C.2 is silicone acrylate composite rubber.

The gel content of the graft base C.2 is determined at 25° C. In a suitable solvent (M. Hoffmann, H. Krömer, R. Kuhn, Polymeranalytik I und II [Polymer analysis 1 and 11], Georg Thieme-Verlag, Stuttgart 1977).

The median particle size $d_{50}$ is the diameter with in each case 50% by weight of the particles above it and 50% by weight of the particles below it. It can be determined by using ultracentrifuge measurement (W. Scholtan, H, Lange, Kolloid, Z. und Z. Polymere 250 (1972), 782-796). Glass transition temperature is determined by using differential scanning calorimetry (DSC) in accordance with the standard DIN EN 61006 (DIN EN 61006:2004-11) at a heating rate of 10 Klmin, where $T_g$ is defined as midpoint temperature (tangent method).

Component D

The flow auxiliaries D used are diglycerol esters. Esters based on various carboxylic acids are suitable. The esters may also be based on different isomers of diglycerol. It is possible to use not only monoesters but also polyesters of diglycerol. It is also possible to use mixtures rather than pure compounds.

Isomers of diglycerol which form the basis for the diglycerol esters used in accordance with the invention are as follows:

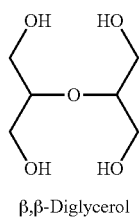

β,β-Diglycerol

For the diglycerol esters used in accordance with the invention, it is possible to use those isomers of these formulae that have been mono- or polyesterified. Mixtures usable as flow auxiliaries are composed of the diglycerol reactants and the ester end products derived therefrom, for example having molecular weights of 348 g/mol (monolauryl ester) or 530 g/mol (dilauryl ester).

The diglycerol esters present in the composition of the invention preferably derive from saturated or unsaturated monocarboxylic acids having a chain length of from 6 to 30 carbon atoms. Suitable monocarboxylic acids are, for example, caprylic acid ($C_7H_{15}COOH$, octanoic acid), capric acid ($C_9H_1COOH$, decanoic acid), lauric acid ($C_{11}H_{23}COOH$, dodecanoic acid), myristic acid ($C_{13}H_{27}COOH$, tetradecanoic acid), palmitic acid ($C_{15}H_{31}COOH$, hexadecanoic acid), margaric acid ($C_{16}H_{33}COOH$, heptadecanoic acid), stearic acid ($C_{17}H_{35}COOH$, octadecanoic acid), arachic acid ($C_{19}H_{39}COOH$, eicosanoic acid), behenic acid ($C_{21}H_{43}COOH$, docosanoic acid), lignoceric acid ($C_{23}H_{47}COOH$, tetracosanoic acid), palmitoleic acid ($C_{15}H_{29}COOH$, (9Z)-hexadeca-9-enoic acid), petroselic acid ($C_{17}H_{33}COOH$, (6Z)-octadeca-6-enoic acid), elaidic acid ($C_{17}H_{33}COOH$, (9E)-octadeca-9-enoic acid), linoleic acid ($C_{17}H_{31}COOH$, (9Z,12Z)-octadeca-9,12-dienoic acid), alpha- or gamma-linolenic acid ($C_{17}H_{29}COOH$, (9Z,12Z,15Z)-octadeca-9,12,15-trienoic acid and (6Z,9Z,12Z)-octadeca-6,9,12-trienoic acid), arachidonic acid ($C_{19}H_{31}COOH$, (5Z,8Z,11Z,14Z)-eicosa-5,8,11,14-tetraenoic acid), timnodonic acid ($C_{19}H_{29}COOH$, (5Z,8Z,11Z,14Z,17Z)-eicosa-5,8,11,14,17-pentaenoic acid) and cervonic acid ($C_{21}H_{31}COOH$, (4Z,7Z,10Z,13Z,16Z,19Z)-docosa-4,7,10,13,16,19-hexacnoic acid). Particular preference is given to laurie acid, palmitic acid and/or stearic acid.

In a preferred embodiment of the process of the invention, the diglycerol ester present n the construction material is an ester of the formula (I)

where R=$COC_pH_{2n+1}$ and/or R=COR',
wherein n is an integer and where R' is a branched alkyl radical or a branched or unbranched alkenyl radical and $C_pH_{2m+1}$ is an aliphatic, saturated linear alkyl radical.

Accordingly, there may also be a mixture of various diglycerol esters.

Diglycerol esters used with preference have an HLB value of at least 6, more preferably 6 to 12, the HLB value being defined as the "hydrophilic-lipophilic balance" which is calculated as follows by the Griffin method:

$$HLB = 2 \times (1 - M_{lipophilic}/M),$$

where $M_{lipophilic}$ is the molar mass of the lipophilic fraction of the diglycerol ester and M is the molar mass of the diglycerol ester.

In a further preferred embodiment, $R = COC_nH_{2n+1}$ where n is an integer of 6-24, preferably 8 to 18, further preferably 10 to 16, especially preferably 12. For example, $C_nH_{2n+1}$ may be n-hexyl, n-heptyl, n-octyl, n-nonyl, n-dodecyl, n-tridecyl, n-tetradecyl, n-hexadecyl or n-octadecyl.

In a further preferred embodiment, diglycerol monolauryl ester (diglycerol monolaurate isomer having the molecular weight of 348 g/mol, which is particularly preferred as main product in a mixture) is present in the construction material. Preferably in accordance with the invention, the aforementioned ester moieties are also present in the other isomers of diglycerol.

The amount of diglycerol esters, based on the total weight of the construction material, is 0.01% to 3.0% by weight, preferably 0.10% to 2.0% by weight, more preferably 0.15% to 1.50% by weight and most preferably 0.20% to 1.0% by weight.

Component E

The compositions of the invention preferably contain an anti-dripping agent. In a further preferred embodiment, at least 0.05% by weight of an anti-dripping agent is present in the construction material. The amount of anti-dripping agent is preferably 0.05% to 5.0% by weight, further preferably 0.10% to 2.0% by weight, more preferably 0.10% to 1.0% by weight, of at least one anti-dripping agent.

An anti-dripping agent added to the construction material is preferably polytetrafluoroethylene (PTFE). PTFE is commercially available in a variety of product qualities. These include Hostaflon® TF2021 or else PTFE blends such as Metablen® A-3800 (about 40% by weight of PTFE, CAS 9002-84-0, and about 60% by weight of methyl methacrylate/butyl acrylate copolymer, CAS 25852-37-3, from Mitsubishi-Rayon) or Blendexe 13449 (about 50% by weight of PTFE and about 50% by weight of SAN [formed from 80% by weight of styrene and 20% by weight of acrylonitrile]) from Chemtura. Preference is given to using Biendex® B449.

Component F

Preferentially suitable thermal stabilizers are triphenylphosphine, tris(2,4-di-tert-butylphenyl) phosphite (Irgafos® 168), tetrakis(2,4-di-tert-butylphenyl)[1,1-biphenyl]-4,4'-diyi bisphosphonite, trisisooctyl phosphate, octadecyl-3-(3,5-di-tert-butyl-4-hydroxyphenyl) propionate (Irganox® 1076), bis(2,4-dicumylphenyl)pentaerythritol diphosphite (Doverphos® S-9228), bis(2,6-di-tert-butyl-4-methylphenyl)pentaerythritol diphosphite (ADK STAB PEP-36). They are used alone or in a mixture (for example Irganox® B900 (mixture of Irgafos® 168 and Irganox® 1076 in a 1:3 ratio) or Doverphos® S-9228 with Irganox® 13900/Irganox® 1076). The thermal stabilizers are preferably used in amounts of 0.003% to 0.2% by weight.

Component G

In addition, optionally up to 10.0% by weight, preferably 0.10% to 8.0% by weight, more preferably 0.2% to 3.0% by weight, of other customary additives ("further additives") are present. The group of further additives does not include any flame retardants, any anti-dripping agents or any thermal stabilizers, since these have already been described as components B, E and F. Nor does the group of further additives include any glass fibers, carbon fibers or carbon nanotubes, since these are already covered by group C. "Further additives" also exclude flow auxiliaries from the group of the diglycerol esters because these are already covered as component D.

Such additives as customarily added to polycarbonates are especially the antioxidants, UV absorbers, IR absorbers, antistats, optical brighteners, light-scattering agents, colorants such as pigments, including inorganic pigments, carbon black and/or dyes, and inorganic fillers such as titanium dioxide or barium sulfate that are described in EP-A 0 839 623, WO-A 96/15102, EP-A 0 500 496 or "Plastics Additives Handbook", Hans Zweifel, 5th Edition 2000, Hamer Verlag, Munich, in the amounts customary for polycarbonate. These additives may be added individually or else in a mixture.

Preferred additives are specific UV stabilizers having minimum transmittance below 400 nm and maximum transmittance above 400 nm. Ultraviolet absorbers particularly suitable for use in the composition of the invention are benzotriazoles, triazines, benzophenones and/or arylated cyanoacrylates.

Particularly suitable ultraviolet absorbers are hydroxybenzotriazoles, such as 2-(3',5"-bis(1,1-dimethylbenzyl)-2'-hydroxyphenyl)benzotriazole (Tinuvin® 234, BASF, Ludwigshafen), 2-(2'-hydroxy-5'-(tert-octyl)phenyl) benzotriazole (Tinuvin® 329, BASF, Ludwigshafen), bis(3-(2H-benzotriazolyl)-2-hydroxy-5-tert-octyl)methane (Tinuvin® 360, BASF, Ludwigshafen), 2-(4,6-diphenyl-1,3, 5-triazin-2-yl)-5-(hexyloxy)phenol (Tinuvin® 1577, BASF, Ludwigshafen), and also benzophenones such as 2,4-dihydroxybenzophenone (Chimassorb® 22, BASF, Ludwigshafen) and 2-hydroxy-4-(octyloxy)benzophenone (Chimassorb® 81, BASF, Ludwigshafen), 2,2-bis[[(2-cyano-1-oxo-3,3-diphenyl-2-propenyl)oxy]methyl]-1,3-propanediyl ester (9Cl) (Uvinul® 3030, BASF AG Ludwigshafen), 2-[2-hydroxy-4-(2-ethylhexyl)oxy]phenyl-4,6-di(4-phenyl)phenyl-1,3,5-triazine (Tinuvin® 1600, BASF, Ludwigshafen), tetraethyl 2,2'-(1,4-phenylenedimethylidene)bismalonate (Hostavin® B-Cap, Clariant AG) or N-(2-ethoxyphenyl)-N-(2-ethylphenyl)ethanediamide (Tinuvin® 312, CAS No. 23949-66-8, BASF, Ludwigshafen).

Particularly preferred specific UV stabilizers are Tinuvin® 360, Tinuvin® 329 and/or Tinuvin® 312, very particular preference being given to Tinuvin® 329 and TinLiving) 312.

It is also possible to use mixtures of these ultraviolet absorbers.

The composition preferably contains ultraviolet absorbers in an amount up to 0.8% by weight, preferably 0.05% by weight to 0.5% by weight, further preferably 0.1% by weight to 0.4% by weight, based on the overall composition.

The composition is preferably free of additional demolding agents.

More preferably, at least one thermal stabilizer (component F) and optionally a UV absorber as a further additive are present when glass fibers are used as filler.

The construction material comprising components A to D, optionally without B, and optionally E to G is produced by standard methods of incorporation by combining, mixing and homogenizing the individual constituents, and the homogenization in particular preferably takes place in the melt with application of shear forces. The combining and mixing prior to the melt homogenization is optionally effected using powder premixes.

It is also possible to use premixes of pellets, or of pellets and powders, with components B to G.

Also usable are premixes that have been produced from solutions of the mixture components in suitable solvents, in which case homogenization is optionally effected in solution and the solvent is removed thereafter.

In particular, the components B to G of the composition of the invention may be introduced into the polycarbonate here by known processes or in the form of masterbatch.

Preference is given to the use of masterbatches to introduce components B to G, individually or in a mixture.

In this context, the construction material can be combined, mixed, homogenized and then extruded to give a filament or another suitable shaped body for additive manufacturing methods in standard apparatuses such as screw extruders (for example twin-screw extruders (TSE)), kneaders or Brabender or Banbury mills. It is also possible to premix individual components and then to add the remaining starting materials individually and/or likewise in a mixture.

It is also possible to combine and mix a premix in the melt in the plastifying unit of an injection-molding machine. In this case, the melt is converted directly to a shaped body, especially a filament, in the subsequent step.

A particularly preferred construction material comprises:
A) 20% by weight to 99.0% by weight of aromatic polycarbonate,
B) 0.0% by weight to 1.0% by weight of at least one flame retardant selected from the group sodium perfluorobutanesulfate, potassium perfluorobutanesulfate, sodium perfluoromethanesulfonate, potassium perfluorormethanesulfonate, sodium perfluorooctanesulfate, potassium perfluorooctanesulfate, sodium 2,5-dichlorobenzenesulfate, potassium 2,5-dichlorobenzenesulfate, sodium 2,4,5-trichlorobenzenesulfate, potassium 2,4,5-trichlorobenzenesulfate, sodium methylphosphonate, potassium methylphosphonate, sodium (2-phenylethylene)phosphonate, potassium (2-phenylethylene)phosphonate, sodium pentachlorobenzoate, potassium pentachlorobenzoate, sodium 2,4,6-trichlorobenzoate, potassium 2,4,6-trichlorobenzoate, sodium 2,4-dichlorohenzoate, potassium 2,4-dichlorobenzoate, lithium phenylphosphonate, sodium diphenylsulfone sulfonate, potassium diphenyisulfone sulfonate, sodium 2-formylbenzenesulfonate, potassium 2-formylbenzenesulfonate, sodium (N-benzenesulfonyl)benzenesulfonamide, potassium (N-benzenesulfonyl)benzenesulfonamide, trisodiurn hexafluoroaluminate, tripotassium hexafluoroaluminate, disodium hexafluorotitanate, dipotassium hexafluorotitanate, disodium hexafluorosilicate, dipotassium hexafluorosilicate, disodium hexafluorozirconate, dipotassium hexafluorozirconate, sodium pyrophosphate, potassium pyrophosphate, sodium metaphosphate, potassium metaphosphate, sodium tetrafluoroborate, potassium tetrafluoroborate, sodium hexafluorophosphate, potassium hexafluorophosphate, sodium phosphate, potassium phosphate, lithium phosphate, sodium nonafluoro-1-butanesulfonate, potassium nonafluoro-1-butanesulfontate or mixtures thereof.
C) 0.5% by weight to 50.0% by weight of at least one glass fiber, one carbon fiber and/or carbon nanotubes,
D) 0.01% by weight to 3.0% by weight of at least one flow auxiliary selected from the group of the diglycerol esters, preferably one of the formula (I), most preferably diglycerol monolauryl ester,
E) 0.0?4, by weight to 5.0% by weight of at least one anti-dripping agent,
F) 0.0% by weight to 1.0% by weight of at least one thermal stabilizer,
G) 0.0% by weight to 10.0% by weight of further additives selected from the group of the UV absorbers, IR absorbers, colorants, carbon black and/or inorganic fillers.

This construction material very especially preferably comprises at least one glass fiber, where, even further preferably, the only reinforcing fiber present is glass fiber.

Alternatively, very especially preferably, the construction material comprises a carbon fiber, where, even further preferably, the only reinforcing fiber present is carbon fiber.

In a further preferred embodiment, the construction material has a melt volume flow rate MVR of 2 to 85 cm$^3$/10 min and more preferably of 3 to 75 cm$^3$/10 min, determined to ISO 1133 (testing temperature 300° C., mass 1.2 kg), and the modulus of elasticity, determined to ISO 527, is at least 2100 kg*m$^{-1}$*s$^{-2}$.

In a further preferred embodiment, the process is conducted within a construction space and the temperature of the construction space is ≥10° C. (preferably ≥25° C., more preferably ≥50° C.) lower than the glass transition temperature $T_b$ of the construction material (determined by DSC to DIN EN ISO 11357 at a heating rate of 10° C./min). Particularly in the case of complex and large components with long manufacturing time, this is associated with distinctly lower thermal stress and better trueness of the component to scale.

The present invention further relates to the use of a construction material in an additive melt layering process, wherein the construction material comprises:
A) 20% by weight to 99.0% by weight of aromatic polycarbonate,
B) 0.0% to 1.0% by weight of at least one flame retardant,
C) 0.0% by weight to 50.0% by weight of a component selected from: glass fibers, carbon fibers, carbon nanotubes, graphite, impact modifiers or mixtures of at least two of these,
D) 0.01% by weight to 3.0% by weight of at least one flow auxiliary selected from the group of the diglycerol esters,
E) 0.0% by weight to 5.0% by weight of at least one anti-dripping agent,
F) 0.0% by weight to 1.0% by weight of at least one thermal stabilizer,
G) 0.0% by weight to 10.0% by weight of further additives.

With regard to components A to G, the details set out in connection with the process of the invention are applicable, and these will not be discussed again here for avoidance of repetition. It is likewise possible to employ the same preferred embodiments for the construction material in the use of the invention as in the process of the invention. It should merely be noted that the diglycerol ester present in the construction material is preferably an ester of the formula (I)

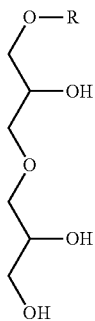

(I)

with R=COC$_n$H$_{2n+1}$ and/or R=COR',
where n is an integer and where R' is a branched alkyl radical or a branched or unbranched alkenyl radical and C$_n$H$_{2n+1}$ is an aliphatic, saturated linear alkyl radical. Very particular preference is given to diglycerol monolauryl ester.

The production of construction materials suitable in accordance with the invention is described by the examples which follow (see WO 2016/087296 A1).

1. Description of Raw Materials and Test Methods

The polycarbonate compositions suitable in accordance with the invention are produced in conventional machines, for example multishaft extruders, by compounding, optionally with addition of additives and other admixtures, at temperatures between 280° C. and 360° C.

The compounds of the invention for the examples which follow were produced in a Berstorff ZE 25 extruder with a throughput of 10 kg/h. The melt temperature was 275° C.

The polycarbonate bases A used were mixtures of components A-1, A-2, A-3, A-4, A-6 and A-7.

Component A-1: linear polycarbonate based on bisphenol A having a melt volume flow rate MVR of 9.5 cm$^3$/10 min (as per ISO 1133 at a testing temperature of 300° C. and load 1.2 kg).

Component A-2: linear polycarbonate in powder form based on bisphenol A having a melt volume flow rate MVR of 6 cm$^3$/10 min (as per ISO 1133 at a testing temperature of 300° C. and load 1.2 kg).

Component A-3: linear polycarbonate based on bisphenol A having a melt volume flow rate MVR of 12.5 cm$^3$/10 min (as per ISO 1133 at a testing temperature of 300° C. and load 1.2 kg).

Component A-4: linear polycarbonate based on bisphenol A having a melt volume flow rate MVR of 6 cm$^3$/10 min (as per ISO 1133 at a testing temperature of 300° C. and load 1.2 kg).

Component A-6: powder of a linear polycarbonate based on bisphenol A having a melt volume flow rate MVR of 19 cm$^3$/10 min (as per ISO 1133 at a testing temperature of 300° C. and load 1.2 kg).

Component A-7: linear polycarbonate based on bisphenol A having a melt volume flow rate MVR of 19 cm$^3$/10 min (as per ISO 1133 at a testing temperature of 300° C. and load 1.2 kg).

Component B: potassium perfluoro-1-butanesulfonate, commercially available as. Bayowett® C4 from Lanxess, Leverkusen, Germany, CAS No. 29420-49-3.

Component C-1: CS108F-14P, chopped short glass fibers (non-binding) from 3B having an average fiber diameter of 14 μm and an average fiber length of 4.0 mm prior to compounding.

Component C-2: CS 7942, chopped short glass fibers (binding) from Lanxess AG having an average fiber diameter of 14 μm and an average fiber length of 4.5 mm prior to compounding.

Component C-3: CF Tenax A HT C493 carbon fibers, chopped short carbon fibers from Toho Tenax Europe GmbH Germany with application of a thermoplastic preparation and with an average cut length of 6 mm prior to compounding.

Component C-4: CNT; Baytubes C150 HP, agglomerates of multiwall nanotubes having small external diameter, narrow diameter distribution and ultrahigh length-to-diameter ratio. Number of walls: 3-15/external diameter: 13-16 nm/external diameter distribution: 5-20 nm/length: 1 to >10 μm/internal diameter: 4 nm/internal diameter distribution: 2-6 nm.

Component C-5: AC 3101 carbon fibers; chopped short carbon fibers from Dow Aksa (Turkey) having an average length of 6 mm prior to compounding.

Component C-6: Tairyfil CS2516 carbon fibers; chopped short carbon fibers from Formosa Plastic Corporation Taiwan having an average length of 6 mm prior to compounding.

Component C-7: CS Special 7968 glass fibers, chopped short glass fibers from Lanxess AG having an average fiber diameter of 11 μm and an average fiber length of 4.5 mm prior to compounding.

Component C-8: CSG 3PA-830 glass fibers, chopped flat glass fibers from Nittobo with a thickness/length ratio of 1:4.

Component C-9: MF7980 glass fibers, ground glass fibers from Lanxess. Unsized E glass having a fiber thickness of 14 μm and an average fiber length of 190 μm.

Component D: Poem DL-100 (diglycerol monolaurate) from Riken Vitamin as flow auxiliary.

Component E: polytetrafluoroethylene (Blendex® 13449 (about 50% by weight of PTFE and about 50% by weight of SAN [from 80% by weight of styrene and 20% by weight of acrylonitrile] from Chemtura).

Component F: triisooctyl phosphate (TOF) from Lanxess AG.

Component G-1: glycerol monostearate (GMS) from Emery Oleochernicals.

Component G-2: pentaerythritol tetrastearate (PETS) from Emery Oleochernicals.

Component G-3: Elvaloy 1820 AC; ethylene-methyl acrylate copolymer from DuPont.

Charpy impact resistance was measured at room temperature according to ISO 7391/179eU on single-sidedly injected test bars measuring 80 mm×10 mm×4 mm, Charpy notched impact resistance was measured at room temperature according to ISO 7391/179A on single-sidedly injected test bars measuring 80 mm×10 mm×3 mm. Vicat softening temperature VST/B50 as a measure of heat distortion resistance was determined in accordance with ISO 306 test specimens measuring 80×10×4 mm with a 50 N ram load and a heating rate of 50° C./h with the Coesfeld Eco 2920 instrument from Coesfeld Materialtest.

UL94 V flammability was measured on bars measuring 127×12.7×1.0 mm, 127×12.7×1.5 mm and 127×12.7×3 mm. The fire class was determined by conducting five experiments in each case, first after storage at 23° C. for 48 h and then with storage at 70° C. for 7 days, UL94-5V flammability was measured on bars measuring 127×12.7×1.5 mm, 127×12.7×2.0 mm and 127×12.7×3.0 mm and also on sheets measuring 150×105×1.5 mm, 150×105×2.0 mm, 150×105× 3.0 mm.

Modulus of elasticity was measured to ISO 527 on single-sidedly injected test specimens having a core measuring 80×10×4 mm. Melt viscosities were determined to ISO 11443 (cone-plate arrangement). Melt volume flow rate (MVR) was determined to ISO 1133 (at a testing temperature of 300° C., mass 1.2 kg) with the Zwick 4106 instrument from Zwick Roell.

2. Compositions

TABLE 1a

Construction materials suitable in accordance with the invention, comprising glass fibers, and comparative and 1V examples 4V

|  |  | Example |  |  |  |  |  |
|---|---|---|---|---|---|---|---|
|  |  | 1V | 2 | 3 | 4V | 5 | 6 |
| A-1 | [% by wt.] | 79.35 | 79.35 | 79.35 | 70 | 70 | 70 |
| A-2 | [% by wt.] | 3.65 | 3.65 | 3.65 | 3 | 3 | 3 |
| A-2 powder | [% by wt.] | 6.29 | 6.09 | 5.89 | 6.29 | 6.09 | 5.89 |
| B | [% by wt.] | 0.2 | 0.2 | 0.2 | 0.2 | 0.2 | 0.2 |
| C-1 | [% by wt.] | 10 | 10 | 10 | — | — | — |
| C-2 | [% by wt.] | — | — | — | 20 | 20 | 20 |
| F | [% by wt.] | 0.01 | 0.01 | 0.01 | 0.01 | 0.01 | 0.01 |
| D | [% by wt.] | — | 0.2 | 0.4 | — | 0.2 | 0.4 |
| E | [% by wt.] | 0.5 | 0.5 | 0.5 | 0.5 | 0.5 | 0.5 |
| MVR | [cm³/10 min] | 5.5 | 10.8 | 16.1 | 4.8 | 10.3 | 20.8 |
| VST/B50 | [° C.] | 148 | 144.9 | 141.7 | 149.3 | 146.2 | 143.2 |
| Charpy impact resistance at RT | [kJ/m²] | 193 | 149 | 111 | 48 | 59 | 56 |
| Modulus of elasticity | [N/mm²] | 3933 | 4080 | 4147 | 5869 | 6062 | 6194 |
| UL 94 V 1.5 mm Assessment |  | V0 | V0 | V0 | V0 | V0 | V0 |

Table 1a reports important properties for construction materials 2, 3, 5 and 6. These are contrasted with the comparative examples 1V and 4V. It is apparent from the table that the compositions according to the comparative examples that do not contain any diglycerol ester have much poorer melt volume flow rates MVR.

The construction materials suitable in accordance with the invention, as well as the considerable improvement in melt volume flow rate and the improvement in melt viscosity, have an increase in modulus of elasticity (stiffness).

The values for the melt viscosities in the table below are each reported together with the shear rates in [1/sec].

TABLE 1b

Construction materials suitable in accordance with the invention, comprising glass fibers, FR additive and comparative examples 7V and 10V

|  |  | Example |  |  |  |  |  |
|---|---|---|---|---|---|---|---|
|  |  | 7V | 8 | 9 | 10V | 11 | 12 |
| A-1 | [% by wt.] | 70 | 70 | 70 | 70 | 70 | 70 |
| A-4 | [% by wt.] | 3.00 | 3.00 | 3.00 | 3.00 | 3.00 | 3.00 |
| A-2 | [% by wt.] | 6.29 | 6.09 | 5.89 | 6.3 | 6.1 | 5.9 |
| C-2 | [% by wt.] | 20 | 20 | 20 | 20 | 20 | 20 |
| B | [% by wt.] | 0.2 | 0.2 | 0.2 | 0.2 | 0.2 | 0.2 |
| E | [% by wt.] | 0.5 | 0.5 | 0.5 | 0.5 | 0.5 | 0.5 |
| D | [% by wt.] | — | 0.2 | 0.4 | — | 0.2 | 0.4 |
| F | [% by wt.] | 0.01 | 0.01 | 0.01 | — | — | — |
| Tests: |  |  |  |  |  |  |  |
| MVR | [ml/10 min] | 4.8 | 11.1 | 17.6 | 4.7 | 10.2 | 19.4 |
| IMVR20' | [ml/10 min] | 4.8 | 11.9 | 19.7 | 4.9 | 12.1 | 20.8 |
| Melt visc. at 300° C. |  |  |  |  |  |  |  |
| eta 50 | [Pas] | 782 | 431 | 294 | 667 | 379 | 286 |
| eta 100 | [Pas] | 672 | 375 | 260 | 627 | 346 | 254 |
| eta 200 | [Pas] | 583 | 326 | 220 | 542 | 303 | 212 |
| eta 500 | [Pas] | 454 | 265 | 175 | 425 | 252 | 168 |

TABLE 1b-continued

Construction materials suitable in accordance with the invention, comprising glass fibers, FR additive and comparative examples 7V and 10V

|  |  | Example | | | | | |
|---|---|---|---|---|---|---|---|
|  |  | 7V | 8 | 9 | 10V | 11 | 12 |
| eta 1000 | [Pas] | 350 | 216 | 147 | 329 | 210 | 143 |
| eta 1500 | [Pas] | 291 | 186 | 129 | 279 | 181 | 128 |
| eta 5000 | [Pas] | 152 | 109 | 79 | 141 | 102 | 77 |
| Melt visc. at 320° C. | | | | | | | |
| eta 50 | [Pas] | 413 | 195 | 141 | 269 | 166 | 124 |
| eta 100 | [Pas] | 375 | 177 | 130 | 244 | 153 | 112 |
| eta 200 | [Pas] | 336 | 157 | 114 | 214 | 135 | 98 |
| eta 500 | [Pas] | 277 | 134 | 92 | 182 | 109 | 80 |
| eta 1000 | [Pas] | 229 | 115 | 79 | 153 | 95 | 67 |
| eta 1500 | [Pas] | 197 | 101 | 73 | 138 | 87 | 62 |
| eta 5000 | [Pas] | 109 | 65 | 52 | 83 | 58 | 44 |
| Melt visc. at 340° C. | | | | | | | |
| eta 50 | [Pas] | 199 | 111 | — | 199 | 95 | — |
| eta 100 | [Pas] | 185 | 104 | 83 | 184 | 90 | — |
| eta 200 | [Pas] | 162 | 92 | 77 | 160 | 86 | 61 |
| eta 500 | [Pas] | 137 | 78 | 65 | 131 | 74 | 54 |
| eta 1000 | [Pas] | 120 | 70 | 54 | 112 | 65 | 48 |
| eta 1500 | [Pas] | 109 | 66 | 49 | 102 | 59 | 44 |
| eta 5000 | [Pas] | 70 | 46 | 36 | 67 | 42 | 32 |
| Vicat VSTB 120 | [° C.] | 153.1 | 148.2 | 145.9 | 153.3 | 148.6 | 145.8 |
| Impact test ISO7391/179eU 4 mm RT | [kJ/m$^2$] | 59 | 66 | 65 | 61 | 66 | 64 |
| Tensile test | | | | | | | |
| Yield stress | [N/mm$^2$] | 102 | 106 | 112 | 101 | 108 | — |
| Elongation at yield | [%] | 3.3 | 3.2 | 3.2 | 3.3 | 3.3 | — |
| Tear strength | [N/mm$^2$] | 101 | 106 | 111 | 100 | 108 | 11 |
| Elongation at break | [%] | 3.3 | 3.2 | 3.1 | 3.5 | 3.3 | 3.1 |
| Modulus of elasticity | [N/mm$^2$] | 5972 | 6050 | 6295 | 5834 | 6118 | 6246 |
| UL94V in 1.5 mm | | | | | | | |
| (48 h 23° C.) | | V1 | V1 | V1 | V0 | V1 | V1 |
| Individual assessment V0/V1/V2/Vfail | | 3/2/—/— | 3/2/—/— | —/5/—/— | 5/—/—/— | 3/2/—/— | 3/2/—/— |
| Afterflame time | [s] | 60 | 88 | 80 | 49 | 65 | 77 |
| Afterflame time (1st application of flame) | [s] | — | — | — | — | — | — |
| (7 d 70° C.) | | V1 | V1 | V1 | V1 | V1 | V1 |
| Individual assessment V0/V1/V2/Vfail | | 4/1/—/— | 3/2/—/— | 3/2/—/— | 1/4/—/— | 4/1/—/— | 3/2/—/— |
| Afterflame time | [s] | 48 | 69 | 72 | 102 | 62 | 79 |
| Afterflame time (1st application of flame) | [s] | 75 | — | — | — | — | — |
| Overall assessment | | V1 | V1 | V1 | V1 | V1 | V1 |

Visit: failed

Table 1b reports important properties for construction materials 8, 9, 11 and 12 that are suitable in accordance with the invention. These are contrasted with the comparative examples 7V and 10V. It is apparent from the table that the compositions according to the comparative examples that do not contain any diglycerol ester have much poorer melt volume flow rates MVR. The flow curves of the construction materials suitable in accordance with the invention each show distinctly reduced melt viscosities over the entire shear range at the different measurement temperatures, which means improved flowability.

The construction materials suitable in accordance with the invention, as well as the considerable improvement in rheological properties, show an increase in modulus of elasticity (stiffness) with retention of the good fire properties.

TABLE 1c

Construction materials suitable in accordance with the invention, comprising glass fibers and FR additive and comparative examples 13V and 16V

|  |  | Examples | | | | | |
|---|---|---|---|---|---|---|---|
|  |  | 13V | 14 | 15 | 16V | 17 | 18 |
| A-7 | [% by wt.] | 30.00 | 30.00 | 30.00 | 30.00 | 30.00 | 30.00 |
| A-2 | [% by wt.] | 50.42 | 50.42 | 50.42 | 50.42 | 50.42 | 50.42 |
| A-6 | [% by wt.] | 5.55 | 5.35 | 5.15 | 5.54 | 5.34 | 5.14 |

TABLE 1c-continued

Construction materials suitable in accordance with the invention, comprising glass fibers and FR additive and comparative examples 13V and 16V

|  |  | Examples | | | | | |
|---|---|---|---|---|---|---|---|
|  |  | 13V | 14 | 15 | 16V | 17 | 18 |
| C-1 | [% by wt.] | 14.00 | 14.00 | 14.00 | 14.00 | 14.00 | 14.00 |
| D | [% by wt.] | — | 0.20 | 0.40 | — | 0.20 | 0.40 |
| B | [% by wt.] | 0.03 | 0.03 | 0.03 | 0.03 | 0.03 | 0.03 |
| F | [% by wt.] | — | — | — | 0.01 | 0.01 | 0.01 |
| Tests: | | | | | | | |
| MVR | [ml/10 min] | 7.2 | 13.4 | 16.5 | 7.4 | 13.5 | 22.6 |
| IMVR20' | [ml/10 min] | 7.2 | 13.6 | 16.8 | 7.6 | 14.2 | 24.2 |
| Melt visc. at 300° C. | | | | | | | |
| eta 50 | [Pas] | 623 | 492 | 371 | 666 | 493 | 370 |
| eta 100 | [Pas] | 577 | 438 | 313 | 568 | 416 | 302 |
| eta 200 | [Pas] | 502 | 378 | 268 | 504 | 354 | 247 |
| eta 500 | [Pas] | 400 | 313 | 231 | 408 | 299 | 207 |
| eta 1000 | [Pas] | 316 | 258 | 197 | 328 | 247 | 176 |
| eta 1500 | [Pas] | 268 | 222 | 173 | 274 | 213 | 157 |
| eta 5000 | [Pas] | 139 | 119 | 102 | 142 | 119 | 94 |
| Melt visc. at 320° C. | | | | | | | |
| eta 50 | [Pas] | 349 | 286 | 270 | 391 | 355 | 243 |
| eta 100 | [Pas] | 337 | 248 | 222 | 327 | 286 | 197 |
| eta 200 | [Pas] | 297 | 235 | 183 | 293 | 233 | 165 |
| eta 500 | [Pas] | 252 | 198 | 149 | 250 | 194 | 133 |
| eta 1000 | [Pas] | 214 | 165 | 130 | 211 | 166 | 116 |
| eta 1500 | [Pas] | 186 | 146 | 119 | 185 | 148 | 105 |
| eta 5000 | [Pas] | 108 | 88 | 78 | 103 | 95 | 72 |
| Melt visc. at 340° C. | | | | | | | |
| eta 50 | [Pas] | 169 | 232 | 164 | 278 | 255 | 115 |
| eta 100 | [Pas] | 168 | 186 | 137 | 204 | 207 | 109 |
| eta 200 | [Pas] | 167 | 148 | 114 | 192 | 171 | 99 |
| eta 500 | [Pas] | 147 | 127 | 99 | 162 | 142 | 83 |
| eta 1000 | [Pas] | 125 | 110 | 86 | 140 | 124 | 73 |
| eta 1500 | [Pas] | 112 | 101 | 79 | 127 | 113 | 69 |
| eta 5000 | [Pas] | 78 | 70 | 54 | 83 | 71 | 52 |
| Vicat VSTB 50 | [° C.] | 150.2 | 146.9 | 145.0 | 150.5 | 146.3 | 143.8 |
| UL94V in 3.0 mm | | | | | | | |
| (48 h 23° C.) | | V0 | V0 | V0 | V0 | V0 | V0 |
| Individual assessment V0/V1/V2/Vfail | | 5/—/—/— | 5/—/—/— | 5/—/—/— | 5/—/—/— | 5/—/—/— | 5/—/—/— |
| Afterflame time | [s] | 24 | 28 | 29 | 32 | 21 | 41 |
| Afterflame time (1st application of flame) | [s] | — | — | — | — | — | — |
| (7 d, 70° C.) | | V0 | V0 | V0 | V0 | V0 | V0 |
| Individual assessment V0/V1/V2/Vfail | | 5/—/—/— | 5/—/—/— | 5/—/—/— | 5/—/—/— | 5/—/—/— | 5/—/—/— |
| Afterflame time | [s] | 23 | 22 | 33 | 26 | 24 | 22 |
| Afterflame time (1st application of flame) | [s] | — | — | — | — | — | — |
| Overall assessment | | V0 | V0 | V0 | V0 | V0 | V0 |

Visit: failed

The values for the melt viscosities in the table below are each reported together with the shear rates in [1/sec].

Table 1c reports important properties for construction materials 14, 15, 17 and 18 that are suitable in accordance with the invention. These are contrasted with the comparative examples 13V and 16V. It is apparent from the table that the compositions according to the comparative examples that do not contain any diglycerol ester have much poorer melt volume flow rates MVR. The flow curves of the construction materials suitable in accordance with the invention each show distinctly reduced melt viscosities over the entire shear range at the different measurement temperatures, which means improved flowability.

The construction materials suitable in accordance with the invention surprisingly not only show the appreciable improvement in the rheological properties but also good flammability properties.

TABLE 1d

Construction materials suitable in accordance with the invention, comprising glass fibers and FR additive and comparative examples 19V and 22V

|  |  | Example |  |  |  |  |  |
|---|---|---|---|---|---|---|---|
|  |  | 19V | 20 | 21 | 22V | 23 | 24 |
| A-7 | [% by wt.] | 73.00 | 73.00 | 73.00 | 73.00 | 73.00 | 73.00 |
| A-6 | [% by wt.] | 4.94 | 4.74 | 4.54 | 4.93 | 4.73 | 4.53 |
| C-7 | [% by wt.] | 20.00 | 20.00 | 20.00 | 20.00 | 20.00 | 20.00 |
| B | [% by wt.] | 0.06 | 0.06 | 0.06 | 0.06 | 0.06 | 0.06 |
| G-3 | [% by wt.] | 0.20 | 0.20 | 0.20 | 0.20 | 0.20 | 0.20 |
| D | [% by wt.] | — | 0.20 | 0.40 | — | 0.20 | 0.40 |
| F | [% by wt.] | — | — | — | 0.01 | 0.01 | 0.01 |
| Tests: |  |  |  |  |  |  |  |
| MVR | [ml/10 min] | 8.5 | 15.7 | 33.4 | 8.2 | 18.2 | 28.9 |
| IMVR20' | [ml/10 min] | 8.7 | 16.1 | 32.3 | 8.7 | 18.9 | 28.3 |
| Vicat VSTB50 | [° C.] | 151.8 | 147.6 | 143.7 | 151.4 | 147.9 | 144 |
| Melt visc. at 300° C. |  |  |  |  |  |  |  |
| eta 50 | [Pas] | 462 | 308 | 148 | 508 | 291 | 193 |
| eta 100 | [Pas] | 415 | 255 | 135 | 449 | 260 | 176 |
| eta 200 | [Pas] | 369 | 242 | 124 | 399 | 235 | 157 |
| eta 500 | [Pas] | 302 | 203 | 107 | 320 | 200 | 133 |
| eta 1000 | [Pas] | 236 | 167 | 94 | 250 | 167 | 117 |
| eta 1500 | [Pas] | 201 | 143 | 87 | 213 | 144 | 104 |
| eta 5000 | [Pas] | 108 | 83 | 57 | 117 | 86 | 65 |
| Melt visc. at 320° C. |  |  |  |  |  |  |  |
| eta 50 | [Pas] | 261 | 182 | 97 | 287 | 183 | 130 |
| eta 100 | [Pas] | 247 | 164 | 85 | 266 | 159 | 111 |
| eta 200 | [Pas] | 238 | 149 | 77 | 239 | 139 | 101 |
| eta 500 | [Pas] | 203 | 128 | 67 | 204 | 124 | 88 |
| eta 1000 | [Pas] | 169 | 111 | 60 | 169 | 108 | 77 |
| eta 1500 | [Pas] | 145 | 99 | 56 | 144 | 97 | 71 |
| eta 5000 | [Pas] | 89 | 61 | 40 | 85 | 61 | 47 |
| Melt visc. at 340° C. |  |  |  |  |  |  |  |
| eta 50 | [Pas] | 159 | 99 | 60 | 183 | 120 | 76 |
| eta 100 | [Pas] | 151 | 97 | 56 | 168 | 105 | 71 |
| eta 200 | [Pas] | 138 | 88 | 49 | 156 | 94 | 63 |
| eta 500 | [Pas] | 122 | 80 | 42 | 137 | 83 | 58 |
| eta 1000 | [Pas] | 108 | 72 | 39 | 119 | 74 | 51 |
| eta 1500 | [Pas] | 98 | 66 | 35 | 105 | 68 | 47 |
| eta 5000 | [Pas] | 65 | 45 | 28 | 68 | 46 | 35 |
| UL94V in 1.0 mm |  |  |  |  |  |  |  |
| (48 h 23° C.) |  | V1 | V2 | V2 | V2 | V1 | V2 |
| Individual assessment V0/V1/V2/Vfail |  | 4/1/—/— | 3/—/2/— | 2/1/2/— | 3/1/1/— | 3/2/—/— | —/—/5/— |
| Afterflame time | [s] | 73 | 61 | 55 | 81 | 97 | 72 |
| Afterflame time (1st application of flame) | [s] | 118 | — | — | >115 | — | — |
| (7 d 70° C.) |  | V2 | V2 | V2 | V2 | V2 | V2 |
| Individual assessment V0/V1/V2/Vfail |  | 3/—/2/— | 1/2/2/— | 1/—/4/— | —/3/2/— | 1/—/4/— | —/—/5/— |
| Afterflame time | [s] | 67 | 92 | 63 | 118 | 54 | 75 |
| Afterflame time (1st application of flame) | [s] | — | — | — | — | — | — |
| Overall assessment |  | V2 | V2 | V2 | V2 | V2 | V2 |

Visit: failed

The values for the melt viscosities in the table below are each reported together with the shear rates in [1/sec].

Table 1 d reports important properties for construction materials 20, 21, 23 and 24 that are suitable in accordance with the invention. These are contrasted with the comparative examples 19V and 22V. It is apparent from the table that the compositions according to the comparative examples that do not contain any diglycerol ester have much poorer melt volume flow rates MVR. The flow curves of the construction materials suitable in accordance with the invention each show distinctly reduced melt viscosities over the entire shear range at the different measurement temperatures, which means improved flowability.

TABLE 1e

Construction materials suitable in accordance with the invention, comprising glass fibers, and comparative examples 25V and 28V

| | | Example | | | | | |
|---|---|---|---|---|---|---|---|
| | | 25V | 26 | 27 | 28V | 29 | 30 |
| A-3 | [% by wt.] | 63.00 | 63.00 | 63.00 | 63.00 | 63.00 | 63.00 |
| A-2 | [% by wt.] | 7.00 | 6.80 | 6.60 | 6.99 | 6.79 | 6.59 |
| C-8 | [% by wt.] | 30.00 | 30.00 | 30.00 | 30.00 | 30.00 | 30.00 |
| D | [% by wt.] | — | 0.20 | 0.40 | — | 0.20 | 0.40 |
| F | [% by wt.] | — | — | — | 0.01 | 0.01 | 0.01 |
| Tests | | | | | | | |
| MVR 300° C./1.2 kg | [cm³/10 min] | 4.5 | 9.1 | 15.3 | 4.5 | 8.8 | 15.3 |
| IMVR20' 300° C./1.2 kg | [cm³/10 min] | 5.1 | 10.4 | 19.9 | 5.6 | 10.9 | 19.0 |
| Melt visc. at 300° C. | | | | | | | |
| eta 50 | [Pas] | 763 | 532 | 376 | 721 | 540 | 420 |
| eta 100 | [Pas] | 669 | 483 | 340 | 677 | 455 | 367 |
| eta 200 | [Pas] | 581 | 430 | 301 | 591 | 377 | 324 |
| eta 500 | [Pas] | 452 | 346 | 249 | 460 | 302 | 266 |
| eta 1000 | [Pas] | 346 | 274 | 205 | 348 | 258 | 218 |
| eta 1500 | [Pas] | 294 | 235 | 174 | 303 | 222 | 189 |
| eta 5000 | [Pas] | 154 | 129 | 104 | 158 | 132 | 113 |
| Melt visc. at 320° C. | | | | | | | |
| eta 50 | [Pas] | 397 | 278 | 133 | 372 | 299 | 220 |
| eta 100 | [Pas] | 60 | 237 | 128 | 365 | 255 | 180 |
| eta 200 | [Pas] | 321 | 209 | 114 | 325 | 228 | 165 |
| eta 500 | [Pas] | 265 | 176 | 95 | 250 | 199 | 132 |
| eta 1000 | [Pas] | 221 | 154 | 83 | 206 | 167 | 110 |
| eta 1500 | [Pas] | 190 | 139 | 75 | 170 | 149 | 95 |
| eta 5000 | [Pas] | 110 | 88 | 55 | 100 | 93 | 68 |
| Melt visc. at 340° C. | | | | | | | |
| eta 50 | [Pas] | 178 | 114 | 84 | 215 | 120 | 104 |
| eta 100 | [Pas] | 168 | 106 | 72 | 187 | 115 | 92 |
| eta 200 | [Pas] | 153 | 95 | 65 | 159 | 105 | 82 |
| eta 500 | [Pas] | 131 | 84 | 57 | 141 | 92 | 66 |
| eta 1000 | [Pas] | 118 | 76 | 51 | 117 | 89 | 57 |
| eta 1500 | [Pas] | 112 | 71 | 48 | 113 | 83 | 52 |
| eta 5000 | [Pas] | 75 | 55 | 35 | 73 | 65 | 42 |

The values for the melt viscosities in the table below are each reported together with the shear rates in [1/sec].

Table 1e reports important properties for construction materials 26, 27, 29 and 30 that are suitable in accordance with the invention. These are contrasted with the comparative examples 25V and 28V. It is apparent from the table that the compositions according to the comparative examples that do not contain any diglycerol ester have much poorer melt volume flow rates MVR. The flow curves of the construction materials suitable in accordance with the invention each show distinctly reduced melt viscosities over the entire shear range at the different measurement temperatures, which means improved flowability.

TABLE 1f

Construction materials suitable in accordance with the invention, comprising glass fibers, and comparative examples 31V and 34V

| | | Examples | | | | | |
|---|---|---|---|---|---|---|---|
| | | 31V | 32 | 33 | 34V | 35 | 36 |
| A-3 | [% by wt.] | 63.00 | 63.00 | 63.00 | 63.00 | 63.00 | 63.00 |
| A-2 | [% by wt.] | 7.00 | 6.80 | 6.60 | 6.99 | 6.79 | 6.59 |
| C-9 | [% by wt.] | 30.00 | 30.00 | 30.00 | 30.00 | 30.00 | 30.00 |
| D | [% by wt.] | — | 0.20 | 0.40 | — | 0.20 | 0.40 |
| F | [% by wt.] | — | — | — | 0.01 | 0.01 | 0.01 |
| Tests | | | | | | | |
| MVR 300° C./1.2 kg | [cm³/10 min] | 5.3 | 10.1 | 19.4 | 5.5 | 9.9 | 9.8 |
| IMVR20' 300° C./1.2 kg | [cm³/10 min] | 5.9 | 13.4 | 24.3 | 5.8 | 12.6 | 24.8 |
| Melt visc. at 300° C. | | | | | | | |
| eta 50 | [Pas] | 699 | 586 | 436 | 630 | 534 | 397 |
| eta 100 | [Pas] | 633 | 531 | 390 | 628 | 523 | 390 |
| eta 200 | [Pas] | 580 | 483 | 361 | 579 | 486 | 369 |
| eta 500 | [Pas] | 480 | 408 | 313 | 479 | 411 | 302 |

TABLE 1f-continued

Construction materials suitable in accordance with the invention, comprising glass fibers, and comparative examples 31V and 34V

| | | Examples | | | | | |
|---|---|---|---|---|---|---|---|
| | | 31V | 32 | 33 | 34V | 35 | 36 |
| eta 1000 | [Pas] | 384 | 334 | 263 | 381 | 336 | 264 |
| eta 1500 | [Pas] | 317 | 282 | 230 | 318 | 284 | 227 |
| eta 5000 | [Pas] | 157 | 145 | 125 | 158 | 147 | 122 |
| Melt visc. at 320° C. | | | | | | | |
| eta 50 | [Pas] | 328 | 250 | 175 | 260 | 281 | 200 |
| eta 100 | [Pas] | 305 | 237 | 172 | 255 | 267 | 191 |
| eta 200 | [Pas] | 282 | 233 | 161 | 250 | 254 | 182 |
| eta 500 | [Pas] | 250 | 212 | 152 | 237 | 230 | 169 |
| eta 1000 | [Pas] | 217 | 186 | 138 | 211 | 201 | 153 |
| eta 1500 | [Pas] | 193 | 167 | 124 | 192 | 180 | 142 |
| eta 5000 | [Pas] | 111 | 104 | 81 | 116 | 116 | 91 |
| Melt visc. at 340° C. | | | | | | | |
| eta 50 | [Pas] | 142 | 105 | 69 | 174 | 147 | 90 |
| eta 100 | [Pas] | 137 | 102 | 66 | 173 | 140 | 87 |
| eta 200 | [Pas] | 133 | 99 | 62 | 166 | 137 | 84 |
| eta 500 | [Pas] | 128 | 96 | 60 | 156 | 120 | 82 |
| eta 1000 | [Pas] | 119 | 93 | 56 | 142 | 105 | 79 |
| eta 1500 | [Pas] | 112 | 88 | 56 | 132 | 95 | 77 |
| eta 5000 | [Pas] | 77 | 65 | 46 | 85 | 69 | 58 |

The values for the melt viscosities in the table below are each reported together with the shear rates in [1/sec]

Table 1f reports important properties for construction materials 32, 33, 35 and 36 that are suitable in accordance with the invention. These are contrasted with the comparative examples 31V and 34V. It is apparent from the table that the compositions according to the comparative examples that do not contain any diglycerol ester have much poorer melt volume flow rates MVR. The flow curves of the construction materials suitable in accordance with the invention each show distinctly reduced melt viscosities over the entire shear range at the different measurement temperatures, which means improved flowability.

TABLE 1g

Construction materials suitable in accordance with the invention, comprising glass fibers, and comparative example 37V

| | | 37V | 38 | 39 | 40 | 41 | 42 | 43 |
|---|---|---|---|---|---|---|---|---|
| Recipe | | | | | | | | |
| A-1 | [% by wt.] | 79.35 | 79.35 | 79.35 | 74.35 | 74.35 | 69.35 | 69.35 |
| A-4 | [% by wt.] | 3.65 | 3.65 | 3.65 | 3.65 | 3.65 | 3.65 | 3.65 |
| A-2 | [% by wt.] | 5.85 | 6.1 | 5.9 | 6.1 | 5.9 | 6.1 | 5.9 |
| G-2 | [% by wt.] | 0.45 | — | — | — | — | — | — |
| D | [% by wt.] | — | 0.2 | 0.4 | 0.2 | 0.4 | 0.2 | 0.4 |
| Blendex 449 | [% by wt.] | 0.2 | 0.2 | 0.2 | 0.2 | 0.2 | 0.2 | 0.2 |
| E | [% by wt.] | 0.5 | 0.5 | 0.5 | 0.5 | 0.5 | 0.5 | 0.5 |
| C-1 | [% by wt.] | 10 | 10 | 10 | 15 | 15 | 20 | 20 |
| Tests: | | | | | | | | |
| MVR | [cm³/10 min] | 5.7 | 10.4 | 16.6 | 8.1 | 11.9 | 6.6 | 11.9 |
| IMVR20' | [cm³/10 min] | 5.8 | 11.1 | 17.3 | 8.4 | 12.3 | 7.2 | 11.0 |
| Delta MVR/IMVR20' | | 0.1 | 0.7 | 0.7 | 0.3 | 0.4 | 0.6 | −0.9 |
| BIT | [° C.] | 137 | 137 | 133 | 137 | 132 | 136 | 133 |
| UL94-5V in 3.0 mm | | | | | | | | |
| Bar testing | | yes | yes | yes | yes | yes | yes | yes |
| Sheet testing | | passed | passed | passed | passed | passed | passed | passed |
| Classification | | 94-5VA | 94-5VA | 94-5VA | 94-5VA | 94-5VA | 94-5VA | 94-5VA |
| UL94-5V in 2.0 mm | | | | | | | | |
| Bar testing | | yes | yes | yes | yes | yes | yes | yes |
| Sheet testing | | no | no | no | passed | passed | passed | passed |
| Classification | | 94-5VB | 94-5VB | 94-5VB | 94-5VB | 94-5VB | 94-5VB | 94-5VB |
| UL94-5V in 1.5 mm | | | | | | | | |
| Bar testing | | yes | no | no | no | yes | yes | no |
| Sheet testing | | no | — | — | — | no | passed | — |
| Classification | | 94-5VB | — | — | — | 94-5VB | 94-5VA | — |

Table 1 g reports important properties for construction materials 38 to 43 that are suitable in accordance with the invention. This contrasts with comparative example 37V. It is apparent from the table that the composition according to the comparative example, which does not contain any diglycerol ester, has a distinctly worse melt volume flow rate MVR.

Example 41 shows that, in spite of improvement in the flow rate, the UL 94-5V classification in the fire test is maintained. Example 42 shows that, in the case of nearly an equal MVR, a higher rating in the 94-5V test is actually achievable (from 5VB to 5VA at 1.5 mm).

TABLE 2a

Construction materials suitable in accordance with the invention, comprising carbon fibers, and comparative example 44V

| | | Example | | | |
|---|---|---|---|---|---|
| | | 44V | 45 | 46 | 47 |
| A-3 | [% by wt.] | 81.00 | 81.00 | 81.00 | 81.00 |
| A-2 | [% by wt.] | 7.00 | 6.79 | 6.69 | 6.59 |
| C-3 | [% by wt.] | 12.00 | 12.00 | 12.00 | 12.00 |
| D | [% by wt.] | — | 0.20 | 0.30 | 0.40 |
| F | [% by wt.] | — | 0.01 | 0.01 | 0.01 |
| Results | | | | | |
| MVR | [cm³/10 min] | 7.0 | 8.6 | 11.7 | 20.5 |
| IMVR20' | [cm³/10 min] | 7.6 | 9.9 | 16.9 | 24.1 |
| Melt visc. at 300° C. | | | | | |
| eta 50 | [Pas] | 535 | 492 | 468 | 401 |
| eta 100 | [Pas] | 497 | 466 | 441 | 379 |
| eta 200 | [Pas] | 452 | 423 | 401 | 343 |
| eta 500 | [Pas] | 365 | 346 | 327 | 287 |
| eta 1000 | [Pas] | 292 | 278 | 264 | 233 |
| eta 1500 | [Pas] | 253 | 241 | 226 | 203 |
| eta 5000 | [Pas] | 138 | 130 | 124 | 116 |

TABLE 2a-continued

Construction materials suitable in accordance with the invention, comprising carbon fibers, and comparative example 44V

| | | Example | | | |
|---|---|---|---|---|---|
| | | 44V | 45 | 46 | 47 |
| Melt visc. at 320° C. | | | | | |
| eta 50 | [Pas] | 254 | 236 | 240 | 216 |
| eta 100 | [Pas] | 250 | 227 | 235 | 200 |
| eta 200 | [Pas] | 249 | 225 | 221 | 199 |
| eta 500 | [Pas] | 217 | 198 | 192 | 176 |
| eta 1000 | [Pas] | 184 | 167 | 163 | 154 |
| eta 1500 | [Pas] | 162 | 147 | 143 | 134 |
| eta 5000 | [Pas] | 100 | 93 | 91 | 87 |
| Melt visc. at 340° C. | | | | | |
| eta 50 | [Pas] | 149 | 118 | 109 | 101 |
| eta 100 | [Pas] | 146 | 115 | 107 | 99 |
| eta 200 | [Pas] | 139 | 114 | 105 | 96 |
| eta 500 | [Pas] | 126 | 113 | 103 | 88 |
| eta 1000 | [Pas] | 107 | 102 | 99 | 77 |
| eta 1500 | [Pas] | 102 | 93 | 90 | 72 |
| eta 5000 | [Pas] | 70 | 64 | 64 | 50 |

The values for the melt viscosities in the table below are each reported together with the shear rates in [1/sec].

Table 2a reports important properties for construction materials 45 to 47 that are suitable in accordance with the invention. This contrasts with comparative example 44V. It is apparent from the table that the compositions according to the comparative example, which does not contain any diglycerol ester, has distinctly worse melt volume flow rates MVR. The flow curves of the construction materials suitable in accordance with the invention each show distinctly reduced melt viscosities over the entire shear range at the different measurement temperatures, which means improved flowability.

TABLE 2b

Construction materials suitable in accordance with the invention, comprising carbon fibers, and comparative examples 48V and 52V

| | | 48V | 49 | 50 | 51 | 52V | 53 | 54 | 55 |
|---|---|---|---|---|---|---|---|---|---|
| Recipe | | | | | | | | | |
| A-3 | [% by wt.] | 81.00 | 81.00 | 81.00 | 81.00 | 81.00 | 81.00 | 81.00 | 81.00 |
| A-2 | [% by wt.] | 7.00 | 6.79 | 6.69 | 6.59 | 7.00 | 6.79 | 6.69 | 6.59 |
| C-5 | [% by wt.] | 12.00 | 12.00 | 12.00 | 12.00 | — | — | — | — |
| C-6 | [% by wt.] | — | — | — | — | 12.00 | 12.00 | 12.00 | 12.00 |
| D | [% by wt.] | — | 0.20 | 0.30 | 0.40 | — | 0.20 | 0.30 | 0.40 |
| F | [% by wt.] | — | 0.01 | 0.01 | 0.01 | — | 0.01 | 0.01 | 0.01 |
| Tests: | | | | | | | | | |
| MVR | [cm³/10 min] | 6.8 | 10.6 | 12.6 | 18.3 | 6.3 | 7.9 | 9.1 | 10.4 |
| IMVR20' | [cm³/10 min] | 7.5 | 13.2 | 17.4 | 25.8 | 7.0 | 10.4 | 11.1 | 13.6 |
| Melt visc. at 300° C. | | | | | | | | | |
| eta 50 | [Pas] | 456 | 366 | 349 | 302 | 513 | 456 | 453 | 452 |
| eta 100 | [Pas] | 424 | 350 | 329 | 284 | 512 | 446 | 427 | 423 |
| eta 200 | [Pas] | 388 | 322 | 303 | 270 | 458 | 411 | 391 | 386 |
| eta 500 | [Pas] | 330 | 275 | 263 | 236 | 376 | 339 | 324 | 320 |

TABLE 2b-continued

Construction materials suitable in accordance with the invention, comprising carbon fibers, and comparative examples 48V and 52V

|  |  | 48V | 49 | 50 | 51 | 52V | 53 | 54 | 55 |
|---|---|---|---|---|---|---|---|---|---|
| eta 1000 | [Pas] | 269 | 226 | 222 | 197 | 299 | 275 | 263 | 257 |
| eta 1500 | [Pas] | 233 | 197 | 196 | 173 | 257 | 239 | 228 | 223 |
| eta 5000 | [Pas] | 126 | 111 | 111 | 103 | 135 | 126 | 123 | 121 |
| Melt visc. at 320° C. |  |  |  |  |  |  |  |  |  |
| eta 50 | [Pas] | 236 | 164 | 146 | 90 | 350 | 252 | 243 | 225 |
| eta 100 | [Pas] | 217 | 158 | 150 | 88 | 326 | 240 | 229 | 218 |
| eta 200 | [Pas] | 193 | 151 | 141 | 86 | 322 | 241 | 225 | 98 |
| eta 500 | [Pas] | 165 | 135 | 134 | 85 | 270 | 211 | 198 | 175 |
| eta 1000 | [Pas] | 145 | 122 | 121 | 78 | 224 | 180 | 171 | 157 |
| eta 1500 | [Pas] | 126 | 110 | 109 | 76 | 192 | 161 | 154 | 135 |
| eta 5000 | [Pas] | 85 | 74 | 74 | 54 | 110 | 97 | 93 | 85 |
| Melt visc. at 340° C. |  |  |  |  |  |  |  |  |  |
| eta 50 | [Pas] | 102 | 56 | 67 | 38 | 163 | 145 | 122 | 134 |
| eta 100 | [Pas] | 101 | 55 | 66 | 37 | 162 | 143 | 117 | 126 |
| eta 200 | [Pas] | 99 | 53 | 61 | 35 | 161 | 138 | 113 | 121 |
| eta 500 | [Pas] | 92 | 52 | 55 | 34 | 136 | 127 | 112 | 110 |
| eta 1000 | [Pas] | 85 | 49 | 50 | 33 | 124 | 115 | 104 | 97 |
| eta 1500 | [Pas] | 18 | 48 | 48 | 32 | 111 | 106 | 95 | 85 |
| eta 5000 | [Pas] | 58 | 38 | 37 | 25 | 75 | 70 | 63 | 62 |

The values for the melt viscosities in the table below are each reported together with the shear rates in [1/sec].

Table 2b reports important properties for construction materials 49 to 51 and 53 to 55 that are suitable in accordance with the invention. These are contrasted with the comparative examples 48V and 52V. It is apparent from the table that the compositions according to the comparative examples that do not contain any diglycerol ester have much poorer melt volume flow rates MVR. The flow curves of the construction materials suitable in accordance with the invention each show distinctly reduced melt viscosities over the entire shear range at the different measurement temperatures, which means improved flowability.

TABLE 3a

Construction materials suitable in accordance with the invention, comprising carbon nanotubes, and comparative examples 56V to 63V

|  |  | Example ||||||||||
|---|---|---|---|---|---|---|---|---|---|---|---|---|
|  |  | 56V | 57V | 58V | 59V | 60V | 61V | 62V | 63V | 64 | 65 | 66 |
| A-3 | [% by wt.] | 90.00 | 90.00 | 90.00 | 90.00 | 90.00 | 90.00 | 90.00 | 90.00 | 90.00 | 90.00 | 90.00 |
| A-2 | [% by wt.] | 10.00 | 8.00 | 7.80 | 7.60 | 7.40 | 7.80 | 7.60 | 7.40 | 7.80 | 7.60 | 7.40 |
| G-1 | [% by wt.] | — | — | 0.20 | 0.40 | 0.60 | — | — | — | — | — | — |
| G-2 | [% by wt.] | — | — | — | — | — | 0.20 | 0.40 | 0.60 | — | — | — |
| D | [% by wt.] | — | — | — | — | — | — | — | — | 0.20 | 0.40 | 0.60 |
| C-4 | [% by wt.] | — | 2.00 | 2.00 | 2.00 | 2.00 | 2.00 | 2.00 | 2.00 | 2.00 | 2.00 | 2.00 |
| Tests: |  |  |  |  |  |  |  |  |  |  |  |  |
| MVR | [cm³/10 min] | 10.6 | 4.2 | 6.1 | 8.6 | 11.6 | 4.3 | 4.7 | 5.3 | 9.6 | 11.8 | 26.1 |
| IMVR20' | [cm³/10 min] | 10 | 4.1 | 6.4 | 10.1 | 14.3 | 4.3 | 5 | 5.4 | 10.2 | 13.5 | 27.2 |
| Vicat VSTB50 | [° C.] | 147.2 | 148.2 | 145 | 142.9 | 140.6 | 146.5 | 145.2 | 143.6 | 145.2 | 142.9 | 139.4 |

Table 3a reports important properties for construction materials 64 to 66 that are suitable in accordance with the invention. These are contrasted with the comparative examples 56V to 63V. It is apparent from the table that the compositions according to the comparative examples that do not contain any diglycerol ester have much poorer melt volume flow rates MVR.

TABLE 3b

Construction materials suitable in accordance with the invention, comprising carbon nanotubes, and comparative examples 67V to 74V

| | | \multicolumn{11}{c}{Example} | | | | | | | | | | |
|---|---|---|---|---|---|---|---|---|---|---|---|---|
| | | 67V | 68V | 69V | 70V | 71V | 72V | 73V | 74V | 75 | 76 | 77 |
| A-3 | [% by wt.] | 90.00 | 90.00 | 90.00 | 90.00 | 90.00 | 90.00 | 90.00 | 90.00 | 90.00 | 90.00 | 90.00 |
| A-2 | [% by wt.] | 10.00 | 7.00 | 6.80 | 6.60 | 6.40 | 6.80 | 6.60 | 6.40 | 6.80 | 6.60 | 6.40 |
| G-1 | [% by wt.] | — | — | 0.20 | 0.40 | 0.60 | — | — | — | — | — | — |
| G-2 | [% by wt.] | — | — | — | — | — | 0.20 | 0.40 | 0.60 | — | — | — |
| D | [% by wt.] | — | — | — | — | — | — | — | — | 0.20 | 0.40 | 0.60 |
| C-4 | [% by wt.] | — | 3.00 | 3.00 | 3.00 | 3.00 | 3.00 | 3.00 | 3.00 | 3.00 | 3.00 | 3.00 |
| Tests: | | | | | | | | | | | | |
| MVR | [cm³/10 min] | 10.2 | 2.2 | 3.7 | 5.7 | 8.2 | 2.5 | 2.8 | 3.2 | 4.9 | 15.7 | 17.7 |
| IMVR20' | [cm³/10 min] | 10.2 | 2.3 | 4.0 | 6.9 | 10.1 | 2.7 | 2.9 | 3.1 | 5.4 | 14.2 | 19.3 |
| Delta MVR/IMVR20' | | 0.0 | 0.1 | 0.3 | 1.2 | 1.9 | 0.2 | 0.1 | −0.1 | 0.5 | −1.5 | 1.6 |
| Vicat VSTB50 | [° C.] | 147.5 | 148.8 | 145.9 | 143.3 | 140.5 | 146.9 | 145.6 | 143.5 | 145.2 | 142.7 | 139.6 |

Table 3b reports important properties for construction materials 75 to 77 that are suitable in accordance with the invention. These are contrasted with the comparative examples 67V to 74V. It is apparent from the table that the compositions according to the comparative examples that do not contain any diglycerol ester have much poorer melt volume flow rates MVR.

TABLE 3c

Construction materials suitable in accordance with the invention, comprising carbon nanotubes, and comparative examples 78V to 83V

| | | \multicolumn{7}{c}{Example} | | | | | | |
|---|---|---|---|---|---|---|---|---|
| | | 78V | 79V | 80V | 81V | 82V | 83V | 84 |
| A-3 | [% by wt.] | 90.00 | 90.00 | 90.00 | 90.00 | 90.00 | 90.00 | 90.00 |
| A-2 | [% by wt.] | 10.00 | 6.00 | 5.40 | 5.80 | 5.60 | 5.40 | 5.40 |
| G-1 | [% by wt.] | — | — | 0.60 | — | — | — | — |
| G-2 | [% by wt.] | — | — | — | 0.20 | 0.40 | 0.60 | — |
| D | [% by wt.] | — | — | — | — | — | — | 0.60 |
| C-4 | [% by wt.] | — | 4.00 | 4.00 | 4.00 | 4.00 | 4.00 | 4.00 |
| Tests: | | | | | | | | |
| MVR | [cm³/10 min] | 10.1 | 0.9 | 4.5 | 0.7 | 1.6 | 1.7 | 11.7 |
| IMVR20' | [cm³/10 min] | 10.0 | 0.9 | 5.3 | 0.8 | 1.7 | 1.7 | 11.6 |
| Vicat VSTB50 | [° C.] | 146.8 | 148.3 | 140.3 | 147.1 | 145.3 | 144 | 140.5 |

Table 3c reports important properties for construction material 84 that is suitable in accordance with the invention. Comparative Examples 78V to 83V, in particular 80V and 83V, are presented in juxtaposition. It is apparent from the table that the compositions according to the comparative examples that do not contain any diglycerol ester have much poorer melt volume flow rates MVR.

For the test of flowability of construction material with and without flow auxiliary in FDM printing, the components which follow were used to extrude strands having a diameter of 1.75 mm. Construction material V85 is a comparative material here, while construction materials 86 and 87 are in accordance with the invention.

TABLE 4a

Construction materials suitable in accordance with the invention, comprising flow auxiliary D

| | | Example | | |
|---|---|---|---|---|
| | | V85 | 86 | 87 |
| A-1 | [% by wt.] | 100 | 99.8 | 99.6 |
| D | [% by wt.] | — | 0.2 | 0.4 |

The filaments were produced with a Fisher Scientific twin-screw extruder. The instrument consists of a Rheodrive7 drive unit and a Rheomex VFW 16/40 compounding unit with a twin screw and a nozzle having a diameter of 3 mm. The materials were introduced into the extruder as dried pellets at 700 and melted and conveyed out of the nozzle with a temperature profile of 250, 270, 280, 290, 300, 300, 300, 260, 250° C. The screw speed was set to 50 rpm. The strand exiting from the nozzle is stretched to a diameter of 1.75 mm, cooled down by means of a water bath and wound up in the form of a filament.

A RepRap X400 CE FDM printer with a combination of an E3D titanium extruder and a 1730-FMH hot end from Achatz Industries was used with the following process conditions: construction space temperature=23° C., extrusion nozzle diameter=0.4 mm. The filaments were conveyed into the printer and extruded for 2.5 min in each ease at different nozzle temperature and different volume flow rate (calculated from set deposition rate and cross-sectional area of the nozzle outlet). The extruded material was collected in a vessel and weighed (actual weight). Using the set deposition rate and the extrusion time, it is possible to calculate the maximum amount of material extruded (target weight). The actual weight was compared with the target weight and reported as extrusion rate in %. The test conditions and results are summarized in table 4b. The nozzle temperature was varied within the range of 240° C.-260° C. In intervals of 10° C.

TABLE 4b

Extrusion rate for construction materials V85, 86 and 87 at different temperatures and different volume flow rates

| Nozzle temperature | Volume flow rate [mm³/s] | Example | | |
|---|---|---|---|---|
| | | V85 Extrusion rate [%] | 86 Extrusion rate [%] | 87 Extrusion rate [%] |
| 240° C. | 3.6 | 60.9 | 89.5 | 90.0 |
| | 4.8 | 43.6 | 84.9 | 86.6 |
| | 5.4 | 35.9 | 86.5 | 89.7 |
| | 6.0 | 20.2 | 82.2 | 87.5 |
| 250° C. | 3.6 | 75.7 | 88.2 | 90.9 |
| | 4.8 | 59.9 | 89.0 | 87.7 |
| | 5.4 | 51.1 | 86.3 | 87.9 |
| | 6.0 | 37.0 | 85.9 | 88.9 |
| 260° C. | 4.8 | 75.1 | 90.4 | 88.1 |
| | 5.4 | 63.5 | 87.8 | 89.4 |
| | 6.0 | 58.7 | 88.2 | 88.5 |

It is apparent that, within the temperature range tested, the construction material V85 has achieved the lowest extrusion rate. With rising preset volume flow rate, the extrusion rate has dropped significantly, for example at 240° C. from 60.87% to 20.16%, with a rise in the volume flow rate from 3.6 to 6.0 mm³/s, Inventive construction materials 86 and 87 generally showed higher extrusion rates. In addition, the extrusion rates remained very stable with rising volume flow rate. Overall, it is apparent that the addition of flow auxiliary assures a higher extrusion rate in the FDM printer and a more constant extrusion rate with high preset volume flow rates.

The improved flowability of the construction materials of the invention surprisingly correlates with a higher preset extrusion rate or resultant volume flow rates in the FDM method at a given temperature and a given conveying pressure. Higher construction rates are thus obtained in combination with comparable or better product properties. In this way, formulations of the invention can be processed at lower temperatures and equal construction rates, which can be a great advantage in the case of simultaneous processing of thermally sensitive materials.

The invention claimed is:

1. A process for producing an article by means of an additive manufacturing method, comprising the steps of:
   applying a filament of an at least partly molten construction material to a carrier, such that a layer of the construction material is obtained, corresponding to a first selected cross section of the article;
   applying a filament of the at least partially molten construction material onto a previously applied layer of the construction material to obtain a further layer of the construction material which corresponds to a further selected cross section of the article and which is joined to the previously applied layer;
   repeating the step of applying a filament of the at least partially molten construction material onto a previously applied layer of the construction material until the article has been formed;
   wherein the process is conducted within a construction space and the temperature of the construction space is greater than or equal to a temperature that is 10° C. below the glass transition temperature $T_g$ of the construction material (determined by DSC at a heating rate of 10° C./min), and
   wherein
   the construction material comprises:
   A) 20% by weight to 99.8% by weight of aromatic polycarbonate, based on a total weight of the construction material
   C) 0.0% by weight to 50.0% by weight of a component selected from: glass fibers, carbon fibers, carbon nanotubes, graphite, impact modifiers or mixtures of at least two of these, based on the total weight of the construction material
   D) 0.01% by weight to 3.0% by weight of at least one flow auxiliary selected from the group of the diglycerol esters, based on the total weight of the construction material.

2. The process as claimed in claim 1, wherein the diglycerol ester present in the construction material is an ester of the formula (I)

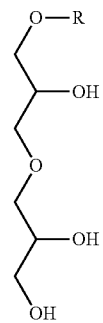

(I)

with $R=COC_nH_{2n+1}$ and/or $R=COR'$,
where n is an integer and where R' is a branched alkyl radical or a branched or unbranched alkenyl radical and $C_nH_{2n+1}$ is an aliphatic, saturated linear alkyl radical.

3. The process as claimed in claim 2, wherein $R=COC_nH_{2n+1}$ and where n is an integer of 6-24.

4. The process as claimed in claim 2, wherein diglycerol monolauryl ester is present in the construction material.

5. The process as claimed in claim 1, wherein glass fibers are present in the construction material as component C and the construction material also has one or more of the following properties:
- the construction material contains 0.001% to 1.0% by weight of a flame retardant
- the glass fibers are chopped glass fibers
- glass fibers have been incorporated in the construction material by compounding and the glass fibers have a length prior to the compounding of 0.5 mm to 10 mm
- the glass fibers have an average fiber diameter of 5 to 25 µm.

6. The process as claimed in claim 1, wherein the graphite comprises at least partly expanded graphite.

7. The process as claimed in claim 1, wherein the impact modifier comprises one or more graft polymer(s) of
- C.1 5% to 95% by weight of at least one vinyl monomer onto
- C.2 95% to 5% by weight of at least one graft base selected from diene rubbers, EP(D)M rubbers, acrylate rubbers, polyurethane rubbers, silicone rubbers, silicone acrylate rubbers, chloroprene rubbers, ethylene/vinyl acetate rubbers or mixtures of at least two of these.

8. The process as claimed in claim 1, wherein the construction material comprises carbon fibers.

9. The process as claimed in claim 1, wherein the construction material further comprises: B) 0.001% to 1.0% by weight of at least one flame retardant, based on the total weight of the construction material.

10. The process as claimed in claim 9, wherein the flame retardant present in the construction material is an alkali metal and/or alkaline earth metal salt of an aliphatic or aromatic sulfonic acid or of a sulfonamide.

11. The process as claimed in claim 1, wherein the construction material further comprises: E) 0.05% by weight to 5.0% by weight of at least one anti-dripping agent, based on the total weight of the construction material.

12. The process as claimed in claim 1, wherein the construction material further comprises: F) 0.003% by weight to 1.0% by weight of at least one thermal stabilizer, based on the total weight of the construction material.

13. The process as claimed in claim 1, wherein the construction material further comprises: G) 0.1% by weight to 10.0% by weight of further additives, based on the total weight of the construction material.

* * * * *